(12) United States Patent
Shimizu et al.

(10) Patent No.: US 10,560,262 B2
(45) Date of Patent: Feb. 11, 2020

(54) INFORMATION-PROCESSING SYSTEM, INFORMATION-PROCESSING APPARATUS, MANAGEMENT APPARATUS, AND PROCESSING METHOD

(71) Applicant: FUJITSU LIMITED, Kawasaki-shi, Kanagawa (JP)

(72) Inventors: Takashi Shimizu, Kawasaki (JP); Takashi Miyoshi, Ohta (JP)

(73) Assignee: FUJITSU LIMITED, Kawasaki (JP)

( * ) Notice: Subject to any disclaimer, the term of this patent is extended or adjusted under 35 U.S.C. 154(b) by 305 days.

(21) Appl. No.: 15/423,053

(22) Filed: Feb. 2, 2017

(65) Prior Publication Data
US 2017/0250802 A1   Aug. 31, 2017

(30) Foreign Application Priority Data
Feb. 25, 2016 (JP) ................................ 2016-034590

(51) Int. Cl.
*H04L 9/08* (2006.01)
*G06F 12/14* (2006.01)
(Continued)

(52) U.S. Cl.
CPC ........ *H04L 9/0816* (2013.01); *G06F 9/45558* (2013.01); *G06F 12/1408* (2013.01);
(Continued)

(58) Field of Classification Search
None
See application file for complete search history.

(56) References Cited

U.S. PATENT DOCUMENTS 9,608,809 B1 *   3/2017   Ghetti ..................... H04L 9/083
9,779,269 B1 *   10/2017   Perlman .............. G06F 16/2291
(Continued)

FOREIGN PATENT DOCUMENTS

JP   2006-127349   5/2006
JP   2011-248503   12/2011

OTHER PUBLICATIONS

Intel Corporation, "Intel QuickAssist Technology Intel QuickPath Interconnect FPGA Release 4.1.7 Core Cache Interface (CCI) Specification", 2015, pp. 1-43.

*Primary Examiner* — Jason Chiang
(74) *Attorney, Agent, or Firm* — Staas & Halsey LLP

(57) ABSTRACT

An apparatus includes a first-processor, and a programmable integrated circuit coupled to the first-processor; a second-processor, and a memory coupled to the second-processor, the second-processor being configured to access the first-processor; and a third-processor to manage the first-processor, wherein the first-processor is configured to write, to the rewritable-integrated circuit, a computation circuit to perform computation according to information from the second-processor, and an encryption circuit to generate encrypted data by encrypting a computation result computed by the computation circuit, by using an encryption key for the computation circuit, the third-processor is configured to manage the encryption key in association with the computation circuit and notify the second-processor of the encryption key for the computation circuit, and the second-processor is configured to read out the encrypted data from the memory for storing the encrypted data, and decrypt the read encrypted data by using the encryption key notified from the third-processor.

20 Claims, 15 Drawing Sheets

(51) Int. Cl.
  *G09C 1/00*       (2006.01)
  *G06F 9/455*      (2018.01)
  *H04L 29/06*      (2006.01)

(52) U.S. Cl.
  CPC .............. *G09C 1/00* (2013.01); *H04L 9/0894* (2013.01); *H04L 63/0435* (2013.01); *H04L 63/0485* (2013.01)

(56) References Cited

U.S. PATENT DOCUMENTS

| | | | |
|---|---|---|---|
| 10,013,364 B1* | 7/2018 | O'Brien | G06F 12/1408 |
| 2011/0040771 A1* | 2/2011 | Gilyadov | G06F 13/385 |
| | | | 707/754 |
| 2011/0161656 A1* | 6/2011 | Rao | G06F 21/335 |
| | | | 713/153 |
| 2014/0244929 A1* | 8/2014 | Acharya | G06F 3/0605 |
| | | | 711/114 |
| 2015/0012864 A1* | 1/2015 | Goodwin | G06F 9/45558 |
| | | | 715/771 |
| 2016/0004716 A1* | 1/2016 | Akirav | G06F 16/1748 |
| | | | 707/692 |
| 2016/0062918 A1* | 3/2016 | Androulaki | G06F 12/1408 |
| | | | 713/193 |
| 2017/0099160 A1* | 4/2017 | Mithyantha | H04L 67/10 |
| 2017/0109801 A1* | 4/2017 | Devendra | G06Q 30/04 |
| 2017/0126549 A1* | 5/2017 | Paramasivam | H04L 49/9005 |
| 2017/0195173 A1* | 7/2017 | Izenberg | G06F 9/45558 |

\* cited by examiner

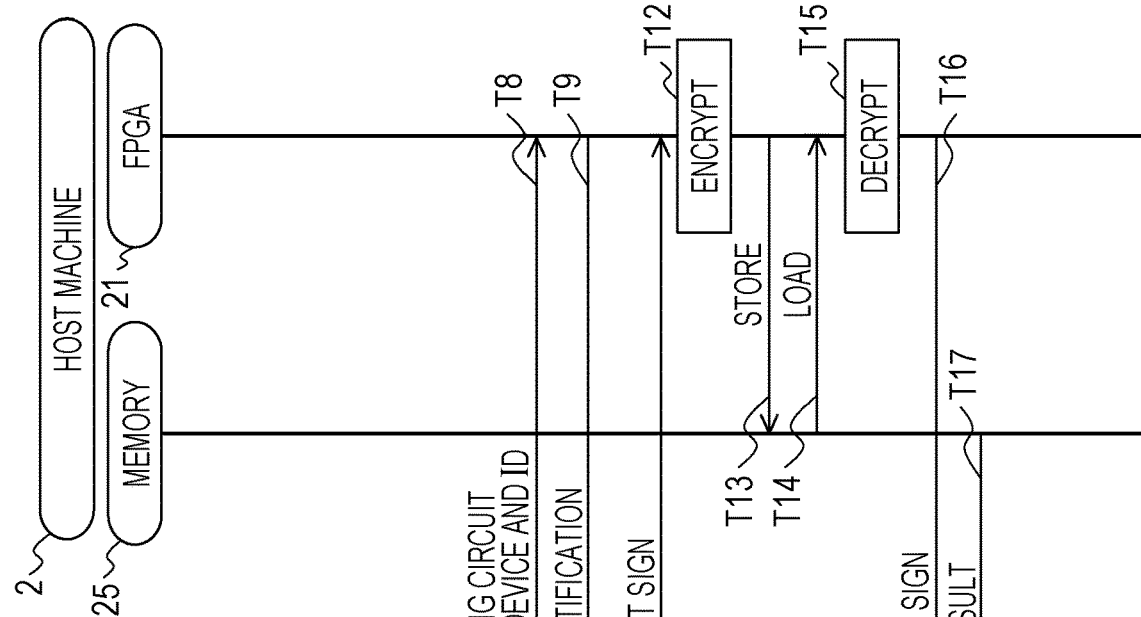
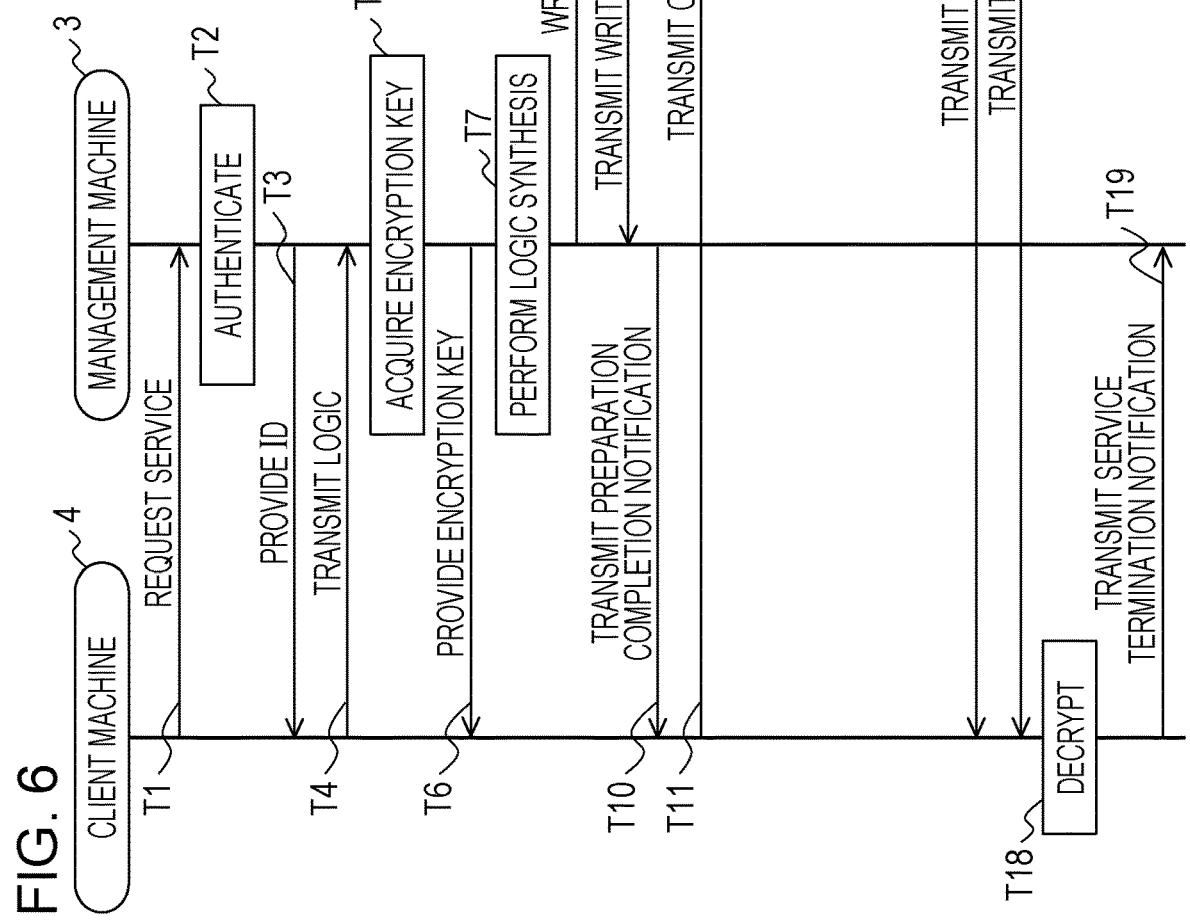
FIG. 6

| USER ID | SERVICE ID | ENCRYPTION KEY | PROCESSING IP CORE | ENCRYPTION IP CORE |
|---|---|---|---|---|
| 001 | aaa | xxx | 001a | 001x |
| 002 | bbb | yyy | 002b | 002y |
| : | : | : | : | : |

INFORMATION-PROCESSING SYSTEM, INFORMATION-PROCESSING APPARATUS, MANAGEMENT APPARATUS, AND PROCESSING METHOD

CROSS-REFERENCE TO RELATED APPLICATION

This application is based upon and claims the benefit of priority of the prior Japanese Patent Application No. 2016-034590, filed on Feb. 25, 2016, the entire contents of which are incorporated herein by reference.

FIELD

The embodiment discussed herein is related to an information-processing system, an information-processing apparatus, a management machine, and a processing method.

BACKGROUND

In recent years, techniques have been studied in which an integrated circuit (IC) capable of re-configuration of circuits, for example, an FPGA, is utilized for computing of an information-processing apparatus such as a server. Here, FPGA stands for Field-Programmable Gate Array.

An information-processing apparatus equipped with an FPGA may configure any logical circuit in the FPGA and cause the logical circuit to operate.

As an example of usage of an FPGA in an information-processing apparatus, there is a case where a logical circuit configured to access a memory is configured in the FPGA, and the FPGA functions as a processor of the information-processing apparatus. In other words, there is a case where an FPGA is treated equivalently to a processor such as a central processing unit (CPU).

As examples of the related art, Japanese Laid-open Patent Publications Nos. 2006-127349 and 2011-248503 are known.

With the spread of cloud services, a server configured to provide a cloud service (hereinafter, also referred to "cloud server" or "host machine") may possibly be equipped with an FPGA as mentioned above.

The cloud server may possibly be operated such that a desired computation circuit is configured in its FPGA by, for example, the user of a terminal (hereinafter, also referred to "client machine") and the result of computation by the computation circuit is returned in response to access from the client machine.

However, for a cloud system, it is sometimes difficult to examine security risk individually for each of computation circuits generated in an FPGA by users.

SUMMARY

According to an aspect of the invention, an apparatus includes a first processor, and an integrated circuit capable of re-write of circuits, the first processor being coupled to the integrated circuit; a second processor, and a memory coupled to the second processor, the second processor being configured to access the first processor; and a third processor configured to manage the first processor, wherein the first processor is configured to write, to the integrated circuit, a computation circuit configured to perform computation according to information transmitted by the second processor, and an encryption circuit configured to generate encrypted data by encrypting a computation result computed by the computation circuit, by using an encryption key for the computation circuit, the third processor is configured to manage the encryption key in association with the computation circuit and notify the second processor of the encryption key for the computation circuit, and the second processor is configured to read out the encrypted data from the memory for storing the encrypted data, and decrypt the read encrypted data by using the encryption key notified from the third processor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a sequence diagram explaining an example of the operation of The information-processing system according to the embodiment;

DESCRIPTION OF EMBODIMENT

Hereinafter, an embodiment will be described with reference to the drawings. It is to be noted that the embodiment to be described below is merely exemplary, and is not intended to exclude application of various modifications and techniques that are not explicitly described below. For example, this embodiment may be carried out by being modified in various ways without departing from the gist of the embodiment.

Figure 1:
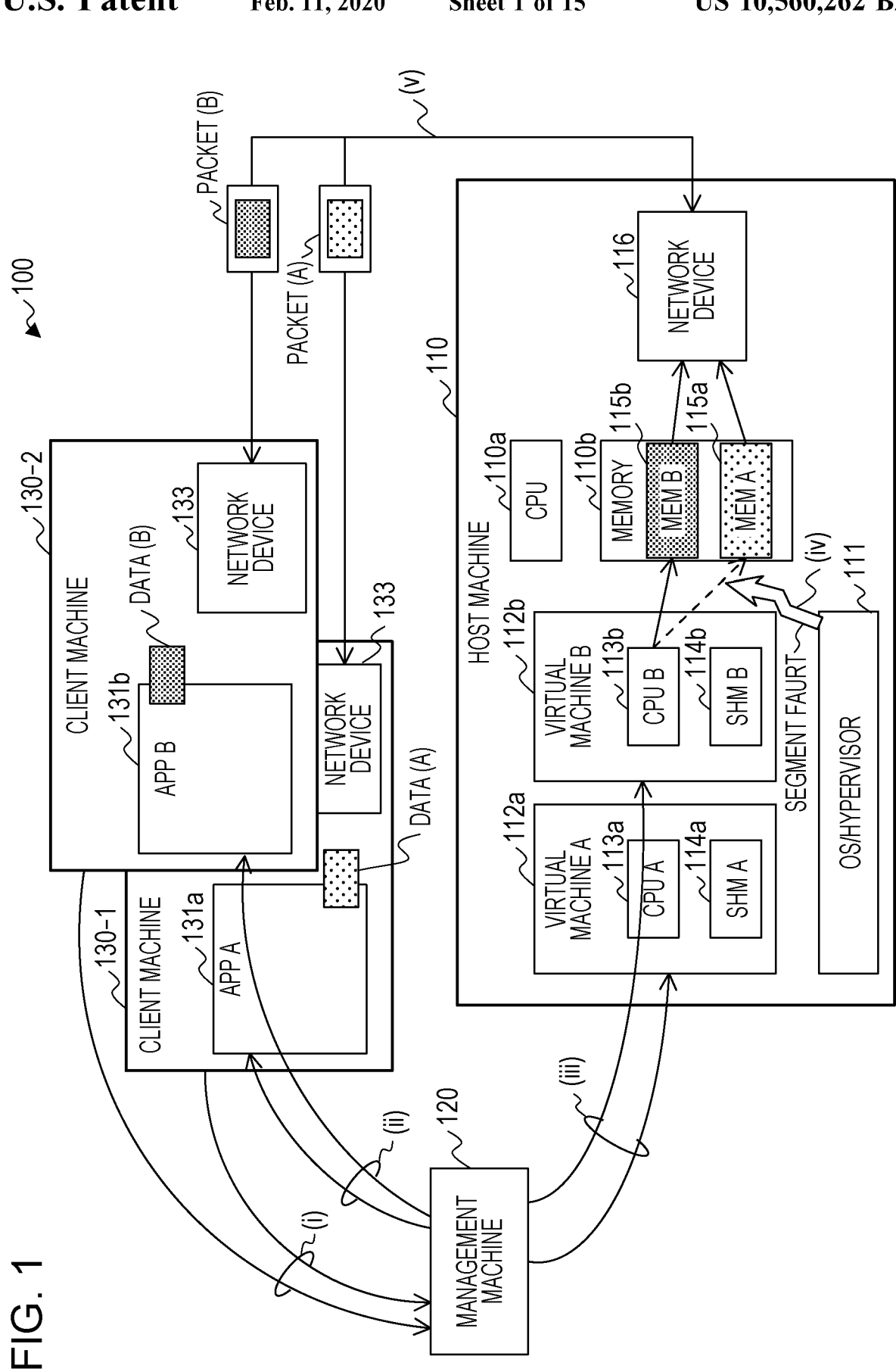
FIG. 1 is a diagram explaining an example of the operation of a cloud system.

Note that in the drawings to be used in the following embodiment, portions denoted by the same reference numeral represent the same or similar portions, unless otherwise noted. Also, when a plurality of elements are not distinguished each other in the following description, they may be expressed without a hyphen "-" and numbers following it in their reference numerals or expressed without alphabetical letters in their reference numerals. For example, when client machines 130-1 and 130-2, illustrated in FIG. 1, are not distinguished from each other, they may be simply referred to as "client machine(s) 130"; when applications 131a and 131b, illustrated in FIG. 1, are not distinguished from each other, they may be simply referred to as "application(s) 131".

1. Embodiment

1.1 Security Risk in Cloud System

First, a security risk in a cloud system will be described.

FIG. 1 is a diagram explaining an example of the operation of a cloud system 100 using a CPU as the processor of a host machine 110. As illustrated in FIG. 1, the cloud system 100 exemplarily includes the host machine 110, a management machine 120, and a plurality (two in the example of FIG. 1) of client machines 130-1 and 130-2. The management machine is a computer and includes a processor and a memory.

As exemplarily illustrated in FIG. 1, each of applications 131a and 131b in the client machines 130-1 and 130-2 transmits a request for using a service to the management machine 120 (see arrows (i) in FIG. 1). The following assumes that the service is provided by a virtual machine.

The management machine 120, which is configured to manage the cloud system, performs service authentication based on the request, and transmits, for example, a virtual-machine identifier (ID) to the corresponding application 131 (see arrows (ii)). Also, the management machine 120 transmits information received from the client machine 130 such for example as a program and data to be used for utilization of the virtual machine, to the host machine 110 (see arrows (iii)).

The host machine 110 runs an operating system (OS) or hypervisor 111 (hereinafter, also referred to as the OS/HPV 111) by using hardware resources such as a CPU 110a and a memory 110b. Also, virtual machines 112a and 112b are run under control of the OS/HPV 111.

In the host machine 110, the virtual machines 112a and 112b share the hardware resources such as the CPU 110a and the memory 110b. For example, the virtual machine 112a utilizes a CPU 113a and a shared memory (SHM) 114a which are implemented by at least some of the hardware resources. Also, the virtual machine 112b utilizes a CPU 113b and a shared memory 114b which are implemented by at least some of the hardware resources.

Figure 2:
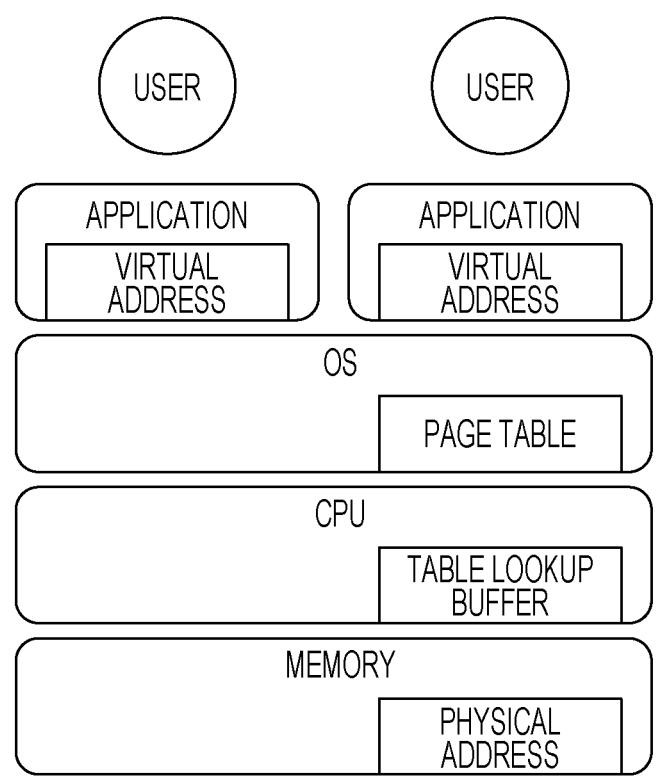
FIG. 2 is a diagram explaining an example of management of a page table by a CPU.

Now, memory address management at a computer will be described. As exemplarily illustrated in FIG. 2, users write applications at virtual addresses, and an OS determines physical addresses to be allocated to the virtual addresses. The association between the virtual addresses and the physical addresses is managed by a page table. The page table is an example of information managing memory allocation.

A CPU copies a translation table for frequently used addresses to a table lookup buffer (TLB) inside the CPU so as to enable the OS to access the page table faster with hardware. Then, based on the TLB, the CPU translates the virtual addresses designated by the applications to physical addresses, and accesses the memories with the translated physical addresses.

As described above, the users recognize their virtual addresses instead of their physical addresses. Hence, it is difficult for a user to access a physical address used by a different user's application.

In the example of FIG. 1 too, the shared memories 114a and 114b are managed with virtual addresses, and physical addresses in the memory 110b are allocated thereto, respectively. Hereinafter, the address area in the memory 110b allocated to the shared memory 114a will be referred to as the memory 115a, and the address area in the memory 110b allocated to the shared memory 114b will be referred to as the memory 115b.

The OS/HPV 111 restricts the virtual machines 112a and 112b from accessing the storage areas in the memory 110b other than their respective memories 115a and 115b.

Thus, if, for example, the user of the application 131b attempts to access the memory 115a, which is for the virtual machine 112a of a different user, through the virtual machine 112b, the OS/HPV 111 blocks the access to the memory 115a. For example, as indicated by arrow (iv) in FIG. 1, the OS/HPV 111 detects a segmentation fault and performs error handling or the like.

The result of computation by the virtual machine 112, stored in its memory 115, is transmitted and received between a network device 113 of the host machine 110 and a network device 133 of the client machine 130 utilizing the virtual machine 112 (see arrows (v)).

For example, a computation result stored in the memory 115a is stored in a packet (A) and transmitted from the network device 116 to the network device 133 of the client machine 130-1, and data (A) in the packet (A) is passed to the application 131a. Also, a computation result stored in the memory 115b is stored in a packet (B) and transmitted from the network device 116 to the network device 133 of the client machine 130-2, and data (B) in the packet (B) is passed to the application 131b.

As described above, in the cloud system 100, which uses the CPU 110a as the processor of the host machine 110, the users of the applications 131 performs processing through their respective virtual machines 112, which are provided by the OS/HPV 111. For this reason, when a user attempts to access a different user's storage area in the memory 110b, the access is blocked by the OS/HPV 111.

Figure 3:
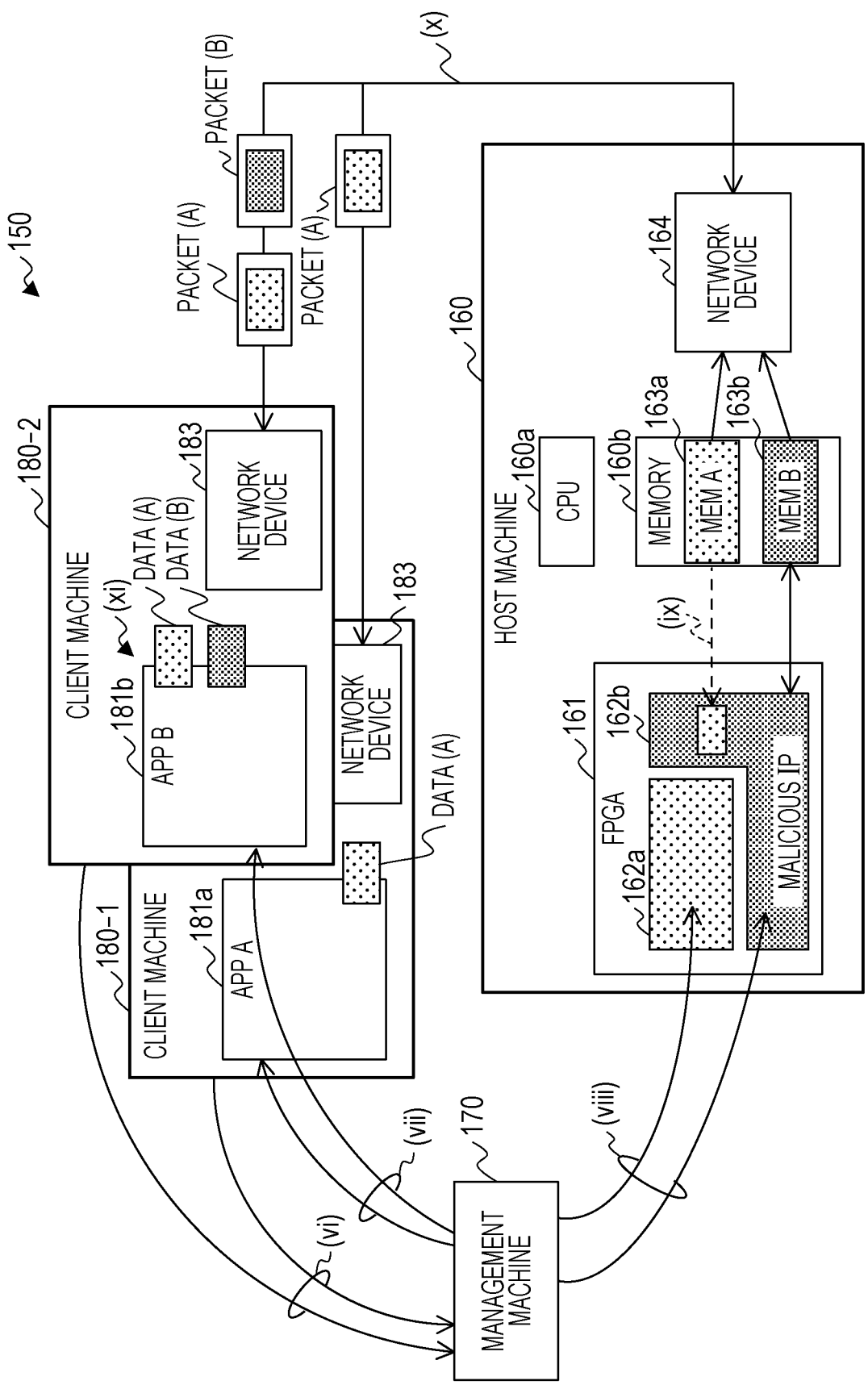
FIG. 3 is an example of the operation of a cloud system.

Next, a case where an FPGA is used as a processor of a host machine will be described. FIG. 3 is a diagram describing an example of the operation of a cloud system 150 using an FPGA as a processor of a host machine 160.

As exemplarily illustrated in FIG. 3, each of applications 181a and 181b in client machines 180-1 and 180-2 transmits a request for using a service to a management machine 170 (see arrows (vi) in FIG. 3). Also, each application 181 transmits information on its processing circuit to be written to an FPGA 161 in the host machine 160, for example, an intellectual property (IP) core, to the management machine 170.

An IP is an example of a functional block reusable in an FPGA, and an IP core is an example of information used to design a functional block to be configured in an FPGA. The IP core may contain a software macro or a hardware macro or a combination thereof. The software macro may contain a program code provided at register transfer level (RTL). Note that the RTL is an example scheme for describing a logical circuit's design data. The hardware macro may contain information on the circuit block to be incorporated in the FPGA. Note that the IP core is sometimes provided in the form of a hardware macro in consideration of the risk that a software macro might be modified.

The management machine 170 performs service authentication based on the request and transmits, for example, a virtual-machine ID to the corresponding application 181 (see arrows (vii)). Also, based on the IP core received from the client machine 180, the management machine 170 implements a processing circuit 162, that is, an accelerator, in the FPGA 161 of the host machine 160 (see arrows (viii)).

In the host machine 160, processing circuits 162*a* and 162*b* configured in the FPGA 161 operate by utilizing memories 163*a* and 163*b*, respectively, which are address areas in a memory 160*b*. Note that in the host machine 160, each of a CPU 160*a* and the FPGA 161 functions as a processor.

Figure 4:
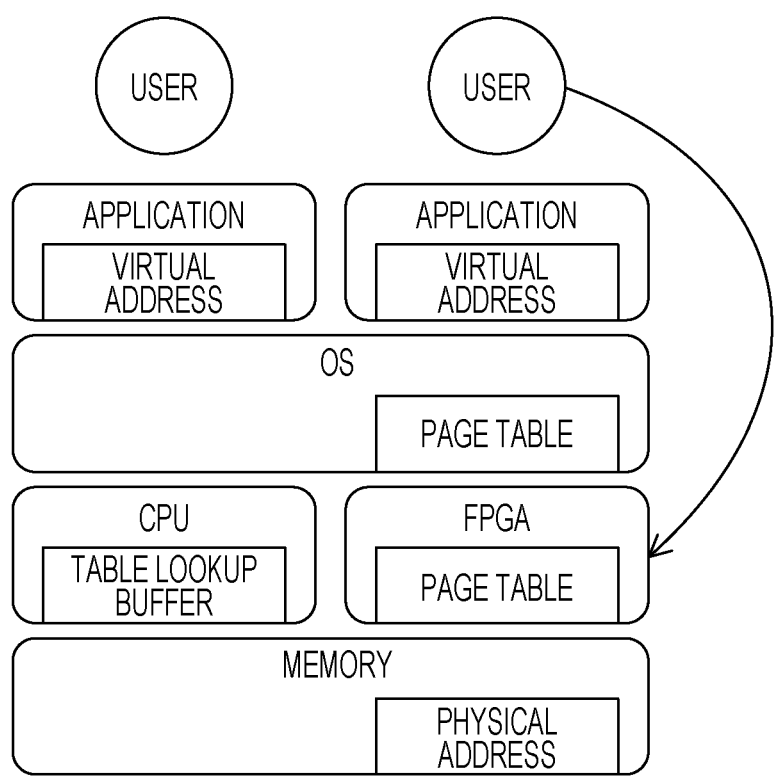
FIG. 4 is a diagram explaining an example of management of a page table by an FPGA processor.

Now, a case where an FPGA processor is used for memory address management at a computer will be described. As exemplarily illustrated in FIG. 4, an FPGA placed on a cache coherence bus is treated equivalently to a CPU copies a page table from an OS.

Meanwhile, a user generates a processing circuit to be implemented in the FPGA. Then, depending on the design of the processing circuit, the user might manipulate the copied page table through the FPGA. For example, the FPGA may change a physical address set on the page table to the physical address of a memory utilized by a different user.

This changing of a physical address set on the page table is sometime done by re-write of the information itself set on the page table or by changing of the information read out from the page table in the course of access from the FPGA to the memory.

Note that the FPGA may access the memory utilized by a different user also due to a user's malicious operation on the FPGA, a design error in the processing circuit, and so on.

In the example of FIG. 3 too, if, for example, the processing circuit 162*b* is a malicious IP generated by the user of the application 181*b*, the OS' protection mechanism does not work against hardware access from the processing circuit 162*b* to the memory 163*a* (see arrow (ix)). The processing circuit 162*b* may then read out the data stored in the memory 163*a*, which is used by a different user. Note that the malicious IP may be described as a re-configurable processor programmed by a malicious user, for example.

Also, the data in the memory 163*a* and the data in the memory 163*b*, read out by the processing circuit 162*b*, are transmitted and received between a network device 164 of the host machine 160 and a network device 183 of the client machine 180-2, which utilizes the processing circuit 162*b* (see arrows (x)).

For example, the data stored in the memory 163*a* and the data stored in the memory 163*b* are stored in packets (A) and (B), respectively, and transmitted from the network device 164 to the network device 183 of the client machine 180-2. Then, data (A) in the packet (A) and data (B) in the packet (B) are both passed to the application 181*b*. Thus, the user of the application 181*b* succeeds in stealing the data (A) of a different user (see arrow (xi)).

As described above, if a user is allowed to freely design a processor, such an FPGA processor might penetrate the access security provided by the OS and directly access hardware. For this reason, a host machine including an FPGA has a higher security risk.

1.2 Information-Processing System According to an Embodiment

In view of the above, in an embodiment, the following configuration lowers the security risk in an information-processing apparatus including an integrated circuit capable of re-configuration of circuits.

An information-processing system may include, for example, an information-processing apparatus, a client machine configured to access the information-processing apparatus, and a management apparatus configured to manage the information-processing apparatus, and the information-processing apparatus may include an integrated circuit capable of re-configuration of circuits. Note that the client machine may be a node (for example, a mobile node).

The integrated circuit may include:

(1) a computation circuit configured to perform computation according to information transmitted by the client machine; and (2) an encryption circuit configured to generate encrypted data by encrypting a computation result computed by the computation circuit, the computation result being encrypted by using an encryption key for the computation circuit.

The management apparatus may manage the encryption key in association with the computation circuit, and notify the client machine of the encryption key for the computation circuit.

The client machine may read out the encrypted data from a storage device (a memory) storing the encrypted data, and decrypt the read encrypted data by using the encryption key notified from the management apparatus.

In The information-processing system with this configuration, the data stored in the storage device is encrypted data encrypted with the encryption key for the computation circuit. Thus, even if this encrypted data is read out by the user of a different computation circuit, the encrypted data will not be decrypted without the right encryption key. Hence, the data will not be stolen by others. Moreover, since the management apparatus notifies its user of the encryption key for a computation circuit, encrypted data from this computation circuit is decrypted with the right encryption key. Hence, decrease in usability is suppressed. Hereinafter, an example of the configuration of the information-processing system will be described.

Figure 5:
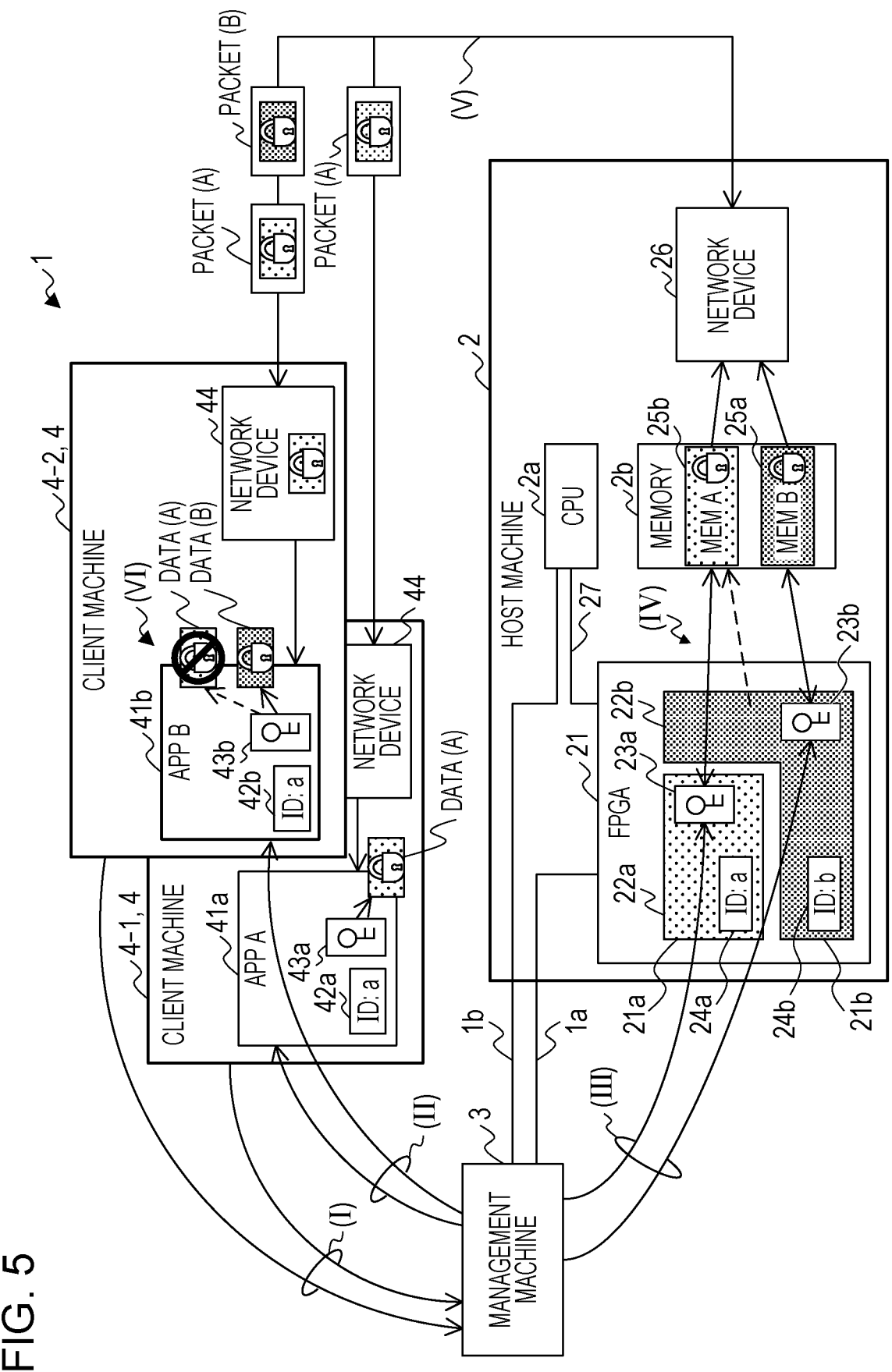
FIG. 5 is a block diagram illustrating an example of the configuration of an information-processing system according to an embodiment.

1.3 Example of Configuration of Information-Processing System According to an Embodiment FIG. 5 is a block diagram illustrating an example of the configuration of an information-processing system 1 according to an embodiment.

As illustrated in FIG. 5, the information-processing system 1 exemplarily includes a host machine 2, a management machine 3, and a plurality (two in the example of FIG. 5) of client machines 4-1 and 4-2. Note that the information-processing system 1 may include a plurality of host machines 2 and/or a plurality of management machines 3, and the information-processing system 1 may include three or more client machines 4.

The host machine 2 is an example of an information-processing apparatus. Examples of the host machine 2 include various computers such as a server and a personal computer (PC). For example, the host machine 2 may be utilized in a cloud service providing a cache coherent FPGA as a processor in which a processing circuit desired by a user is configured in response to a request from the user.

The host machine 2 may exemplarily include a CPU 2*a*, a memory 2*b*, an FPGA 21, and a network device 26. The CPU 2*a* is an example of a processor configured to perform various kinds of control and computation. The memory 2*b* is an example of hardware configured to store information of various pieces of data, programs, and the like. Examples of the memory 2*b* include a volatile memory such as a random access memory (RAM).

The FPGA 21 is an example of an integrated circuit capable of re-configuration of circuits. The host machine 2 may include a plurality of FPGAs 21.

Logical blocks may not be configured in the FPGA 21 at the time of manufacture or shipment of the host machine 2 or before provision of the cloud service, such as before boot of the host machine 2. The example of FIG. 5 illustrates a state where logical blocks have been configured in response to requests from the client machines 4-1 and 4-2 in an operational phase of the information-processing system 1.

The FPGA 21 may be placed on a cache coherence bus treated equivalently to the CPU 2*a*. In that case, control may be performed to maintain coherence between the caches used by the FPGA 21 and the CPU 2*a* for memory access.

As illustrated in FIG. 5, the FPGA 21 may include a first area 21*a* in which a processing circuit 22*a*, an encryption device 23*a*, and an ID 24*a* are configured, and a second area 21*b* in which a processing circuit 22*b*, an encryption device 23*b*, and an ID 24*b* are configured.

The processing circuit 22 is an example of a computation circuit configured to perform computation according to information transmitted by the client machine 4.

The encryption device 23 is an example of an encryption circuit configured to generate encrypted data by encrypting a computation result computed by the processing circuit 22, the computation result being encrypted by using an encryption key for the processing circuit 22. Note that the encrypted data encrypted by the encryption device 23 may be written to a memory 25 in the memory 2*b* allocated to the processing circuit 22, based on management information (not illustrated) managing an address in the memory 2*b*. Also, the encryption device 23 may decrypt the encrypted data read out from the memory 25 by using the encryption key and pass the decrypted data to the processing circuit 22. The write and read of the encrypted data to and from the memory 25 may be performed by the processing circuit 22, the encryption device 23, a different circuit in the FPGA 21, the CPU 2*a*, any other device or circuit, or the like.

Note that the management information may be a page table managed by an OS run by the CPU 2*a* or the FPGA 21. As illustrated in FIG. 5, the memory 2*b* may include a memory 25*a* as the address area at the physical address allocated to the processing circuit 22*a*, and a memory 25*b* as the address area at the physical address allocated to the processing circuit 22*b*.

Various known methods are available for the encryption by the encryption device 23. For example, a symmetric encryption method may be used as the encryption method. Note that an asymmetric encryption method may be used instead of a symmetric encryption method.

Note that the host machine 2 may not include the memory 25 (or the memory 2*b*), to which to write encrypted data from the FPGA 21. For example, the memory 25 (or the memory 2*b*) may be included in a different host machine or any information-processing apparatus.

The ID 24 is information of an identifier to be used in providing the cloud service and may be, for example, an ID of the area 21*a* or 21*b* or an ID of the processing circuit 22 (accelerator).

The network device 26 communicates with the client machine 4 through a network not illustrated. Note that the network device 26 may be used also for communication between the management machine 3 and the host machine 2. Examples of the network include the Internet, a local area network (LAN), a wide area network (WAN), and the like.

The management machine 3 is an example of a management apparatus configured to manage the host machine 2. Examples of the management machine 3 include various computers such as a server and a PC, and such a computer includes a processor and a memory. The management machine 3 may manage the encryption key in association with the processing circuit 22 and notify the client machine 4 for utilizing the processing circuit 22 of the encryption key for the processing circuit 22.

Also, in response to a request from the client machine 4, the management machine 3 may perform control to configure the processing circuit 22 and the encryption device 23 in the FPGA 21 based on first information to be used to configure the processing circuit 22 and second information to be used to configure the encryption device 23. Note that the management machine 3 may also control the write of the ID 24 to the FPGA 21. The first information and the second information may each be an IP core. As mentioned above, an IP core may contain a software macro or a hardware macro or a combination thereof. In the following description, the first information will also be referred to as "processing IP core", and the second information will also be referred to as "encryption IP core".

Note that the management machine 3 may receive the information of the processing IP core from the client machine 4. Also, the management machine 3 may receive the information of the encryption IP core from the client machine 4, or the management machine 3 may generate it upon acquisition of the encryption key to be associated with the processing IP core. Alternatively, the management machine 3 may read out an encryption IP core stored in advance and set the acquired encryption key for the read encryption IP core. The management machine 3 may receive the encryption key from the client machine 4 along with the encryption IP core, or the management machine 3 may generate the encryption key by a known method.

Various methods are available for implementing the control to configure logical circuits in the FPGA 21. For example, as illustrated in FIG. 5, the management machine 3 and the FPGA 21 of the host machine 2 may be connected by a dedicated line 1*a*, and the management machine 3 may implement an accelerator such as the processing circuit 22 and the encryption device 23 in the FPGA 21. Note that the dedicated line 1*a* is connected directly to the FPGA 21 in the example of FIG. 5 for the sake of convenience. The dedicated line 1*a* may be connected to the FPGA 21 through a network.

Alternatively, the management machine 3 may command the OS run by the CPU 2*a* of the host machine 2 to implement the accelerator in the FPGA 21 through a communication line 1*b* and, upon receipt of the command, the OS may implement the accelerator in the FPGA 21 through a control line 27. Note that the communication line 1*b* is connected to the CPU 2*a* in the example of FIG. 5 for the sake of convenience. The communication line 1*b* may be connected to the network device 26 through a network or directly.

The client machine 4 is an example of a client machine configured to access the host machine 2. Various computers such as a PC, a server, a smartphone, and a tablet are available for the client machine 4.

The client machine 4 exemplarily includes a network device 44 and executes an application 41 with its CPU, a memory, and the like not illustrated. For example, for the client machine 4-1, an application 41a is operated by its user. For the client machine 4-2, an application 41b is operated by its user.

The network device 44 communicates with the host machine 2 through a network not illustrated. Note that the network device 44 may be used also for communication between the client machine 4 and the management machine 3. Examples of the network include the Internet, a LAN, a WAN, and the like.

The client machine 4 may, for example, receive an encryption key 43 for the processing circuit 22 that the client machine 4 utilizes from the management machine 3, and store the encryption key 43 in the memory or the like.

The client machine 4 may also receive an ID 42 of a service from the management machine 3 and store the ID 42 in the memory or the like. Moreover, the client machine 4 may read out encrypted data written to the memory 25 by the encryption device 23 from the memory 25 through the network device 44, and decrypt the read encrypted data by using the encryption key notified from the management machine 3.

Note that the memory from which the client machine 4 reads out the encrypted data may not be the above-mentioned memory 25 to which the encrypted data has been written, but may be a storage device (memory) such as a hard disk drive (HDD) to which the encrypted data has been forwarded from the memory 25. The storage device (memory) to which the encrypted data has been forwarded may be included in the host machine 2 or included in an apparatus other than the host machine 2.

1.4 Operation Example

Next, an example of the operation of the information-processing system 1 with the above-described configuration will be described with reference to FIGS. 5 to 7.

As indicated by arrow (I) in FIG. 5, for example, the application 41a of the client machine 4-1 requests the management machine 3 for a service using the FPGA 21 and transmits the logic of an accelerator. The logic of the accelerator may be IP cores prepared by a client, for example, the user of the application 41a.

The management machine 3 acquires the ID of the service and the encryption key, which is based, for example, on a symmetric encryption method, and transmits the ID and the encryption key to the application 41a (see arrow (II)). The application 41a stores the ID and the encryption key received as an ID 42a and an encryption key 43a, respectively.

In a specific example, as illustrated in FIG. 6, the client machine 4 transmits a service request to the management machine 3 (process T1). The management machine 3 performs service authentication for the request received (process T2) and, for example, issues the ID 42 and transmits the ID 42 to the application 41 (process T3).

Then, the client machine 4 transmits the logic of an accelerator to the management machine (process T4). The management machine 3 acquires the encryption key 43 (process T5) and provides the acquired encryption key 43 to the client machine 4 (process T6).

Then, as illustrated in FIG. 5, the management machine 3, after receiving the logic, performs logic synthesis and implements the processing circuit 22a and the encryption device 23a in the FPGA 21 (see arrow (III)). In doing so, the management machine 3 places the design of the processing circuit 22a, synthesized by the logic synthesis, in the FPGA 21 and places the encryption device 23a, which is configured to perform encryption by using the acquired encryption key, at a memory interface in the FPGA 21.

The logic synthesis may involve, for example, translating an IP core at RTL or the like described in a hardware description language (HDL) into a gate-level netlist, and designing implementation of a logical circuit. The netlist is a form of expression of design data describing a list of wirings (nets) interconnecting elements.

Note that as the HDL, a hardware description language such as Verilog HDL or VHSIC HDL (VHDL) may be used. VHSIC stands for very high speed integrated circuit.

In a specific example, as illustrated in FIG. 6, the management machine 3 performs logic synthesis on the logic of the accelerator (process T7). Then, the management machine 3 writes the processing circuit 22, the encryption device 23, and the ID 24 to the FPGA 21 (process T8). After the write is completed, the FPGA 21 transmits a notification of the completion of the write to the management machine 3 (process T9). Upon receipt of the notification of the completion of the write, the management machine 3 transmits a notification of the completion of the preparation to the client machine 4 (process T10).

Figure 7:
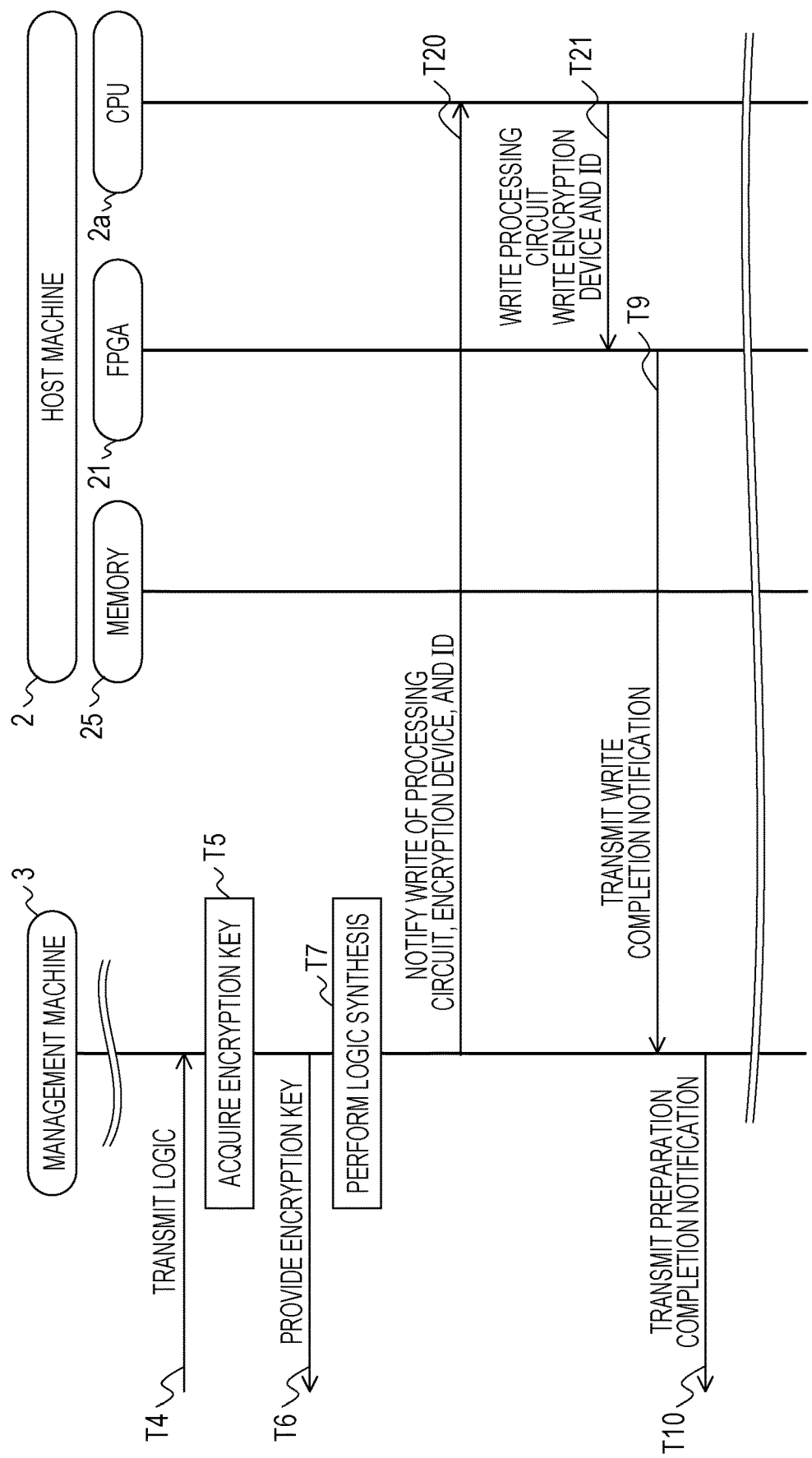
FIG. 7 is a sequence diagram explaining an example of the operation of The information-processing system according to the embodiment.

In a different example, as illustrated in FIG. 7, the management machine 3, after the accelerator logic synthesis in process T7, may notify the CPU 2a of the host machine 2 of write of the processing circuit 22, the encryption device 23, and the ID 24 to the FPGA 21 (process T20). The CPU 2a may write the processing circuit 22, the encryption device 23, and the ID 24 to the FPGA 21 with the OS (process T21). Processes T9 and T10 are similar to those in FIG. 6. Meanwhile, in FIG. 7, the host machine 2 may perform the logic synthesis in process T7.

Then, as illustrated in FIG. 5, the application 41a identifies hardware, for example the processing circuit 22a, configured in the FPGA 21 of the host machine 2, by using the ID 42a, notified from the management machine 3, and causes the processing circuit 22a to execute particular computation. The encryption device 23a in the FPGA 21 encrypts the result of the computation by the processing circuit 22a with the set encryption key. The encrypted data is saved in the memory 25a (see arrow (IV)).

The computation result (data (A)) is also transferred in the form of a packet (A) between the network devices 26 and 44 through a network to be forwarded from the host machine 2 to the client machine 4-1 (see arrow (V)). The application 41a decrypts the data (A) by using the encryption key 43a, notified from the management machine 3.

In a specific example, as illustrated in FIG. 6, the client machine 4 transmits a calculation start sign to the processing circuit 22 in the FPGA 21 identified by the ID 42 (process T11). At the host machine 2, upon receipt of the calculation start sign, a run time is started and a driver for the FPGA 21 is loaded.

Then, the FPGA 21 performs computation with the processing circuit 22 and encrypts the result of the computation with the encryption device 23 (process T12), and stores the encrypted data in the memory 25 allocated to the processing circuit 22 (process T13). Meanwhile, in the computation, encrypted data stored in the memory 25 may be loaded to the FPGA 21 (process T14), the encryption device 23 may decrypt the encrypted data (process T15), and the processing circuit 22 may use the decrypted data.

After the computation by the processing circuit 22 ends, the FPGA 21 transmits a calculation end sign to the client machine 4 (process T16). The encrypted data of the computation result stored in the memory 25 is then forwarded to the client machine 4 through the network devices 26 and 44 (process T17).

The application 41 of the client machine 4 decrypts the encrypted data received by using the encryption key 43 (process T18). After the process ends, the application 41 transmits a service termination notification to the management machine 3 (process T19), and the service using the FPGA 21 is terminated.

Now, consider a case where a malicious user, for example, the user of the application 41b of the client machine 4-2, accesses the data stored in the memory 25a by using the processing circuit 22b, which is a malicious IP, at arrow (IV) in FIG. 5.

Note that if neither of the processing circuits 22a and 22b is a malicious IP, the address set in the management information of the first area 21a or the second area 21b may be an address defined in advance exclusively with respect to the address defined in the management information of the other area (the second area 21b or the first area 21a).

On the other hand, if, for example, the processing circuit 22b is a malicious IP, there is a possibility that the address set in the management information of the second area 21b is a different address other than the address defined in advance exclusively with respect to the address defined in the management information of the first area 21a. This "different address" might be possibly set, for example, by the malicious IP to coincide with the address defined in the management information of the first area 21a.

Alternatively, if the processing circuit 22b is a malicious IP, there is also possible that the address in the management information of the second area 21b is normal (exclusive with respect to the address in the management information of the first area 21a) but this address is changed to the above-mentioned "different address" after being read by the processing circuit 22b.

In either case, the malicious IP might possibly access the memory 25a for the processing circuit 22a based on the management information of the second area 21b.

However, the data stored in the memory 25a is data encrypted with the encryption key for the processing circuit 22a, which is utilized by the application 41a. Thus, even if the user of the application 41b succeeds in acquiring the encrypted data of the application 41a, the user will fail to decrypt the encrypted data without the encryption key 43a (see arrow (VI)).

As described above, the information-processing system 1 does not allow a malicious IP to steal and view data in a different person's memory 25 in the host machine 2, in which the FPGA 21 is used as a processor. Hence, threats of information leakage are reduced. Note that possible examples of the threats of information leakage may be such that, due to data leakage by a malicious IP, for example, accounting information yet to be announced is stolen and the stock price is manipulated or a credit-card number is stolen and used fraudulently.

Thus, with the information-processing system 1 according to the embodiment, reliable data management is realized for the user data stored in the memory 25 of the host machine 2.

In The information-processing system 1 according to the embodiment, the encryption device 23 is added to the FPGA 21 in addition to the processing circuit 22. However, the increase in cost of usage of the FPGA 21, for example, circuit scale, due to the encryption device 23 is small. For example, depending on the user granularity, the increase from the recent years' FPGA circuit scales is as small as about 2 to 5%.

Also, in the information-processing system 1, the encryption and decryption by the hardware of the encryption device 23 cause a latency of about 10%. However, since the processing by the FPGA 21 is pipelining, a certain bandwidth is maintained.

Meanwhile, as a method of lowering the security risk in an information-processing apparatus including an FPGA, one may consider a method in which a management apparatus determines whether or not a logic received is a malicious algorithm. However, such determination is difficult in some cases. Hence, complete protection might not be provided against data leakage by a malicious IP.

Also, as a different method, one may consider a method in which hardware configured to monitor the FPGA is added to the information-processing apparatus. Here, in many cases, a processor's memory access is a bottleneck. Thus, adding the above-mentioned hardware is likely to lead to a decrease in performance and an increase in hardware cost and may not be considered favorable in terms of cost-performance.

Considering the above, the method according to the above-described embodiment may be considered an effective method of lowering the security risk in an information-processing apparatus including an FPGA.

1.5 Example of Hardware Configuration

Next, an example of the hardware configurations of the host machine 2, the management machine 3, and the client machine 4 will be described. Note that the host machine 2, the management machine 3, and the client machine 4 may each include a similar hardware configuration.

In the following, the host machine 2, the management machine 3, and the client machine 4 will be collectively referred to as the computer 5 for the sake of convenience, and an example of the hardware configuration of the computer 5 will be described.

Figure 8:
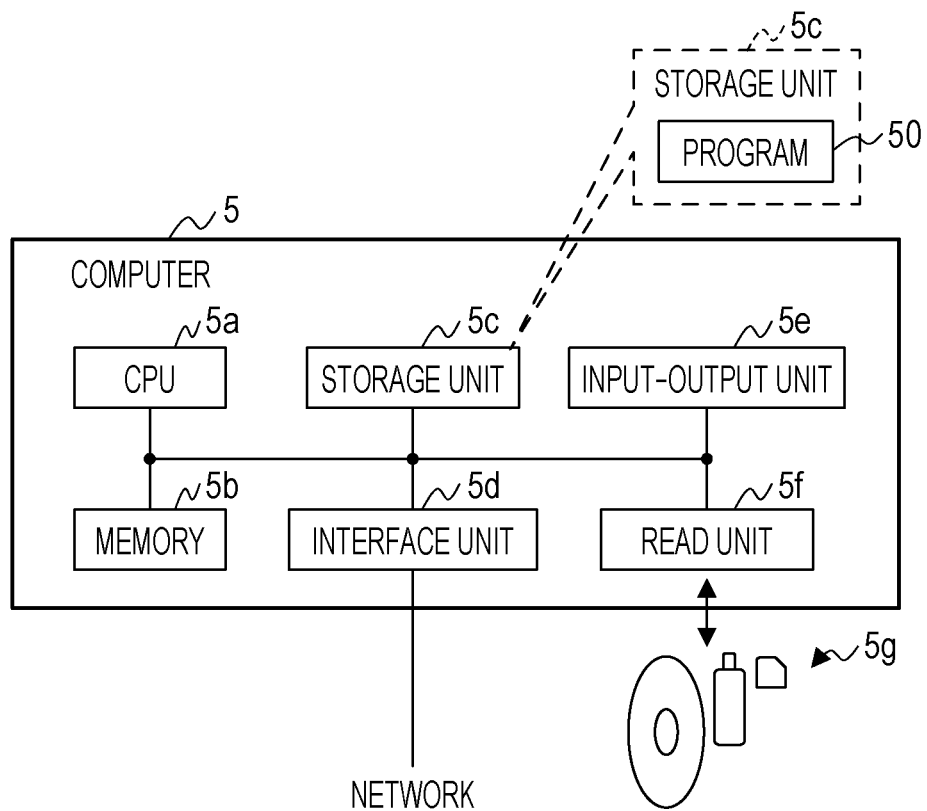
FIG. 8 is a diagram illustrating an example of the hardware configuration of a computer according to the embodiment.

As illustrated in FIG. 8, the computer 5 exemplarily includes a CPU 5a, a memory 5b, a storage unit 5c, an interface unit 5d, an input-output unit 5e, and a read unit 5f.

The CPU 5a is an example of a processor configured to perform various kinds of control and computation. The CPU 5a may be communicatively connected to each block in the computer 5 by a bus. Meanwhile, an electronic circuit, for example, an integrated circuit (IC) such as a micro processing unit (MPU) or an application specific integrated circuit (ASIC) may be used as the processor instead of a computation device such as the CPU 5a.

The memory 5b is an example of hardware configured to store information of various pieces of data, programs, and the like. Examples of the memory 5b include a volatile memory such as a RAM.

Note that the CPU 2a and the memory 2b of the host machine 2, illustrated in FIG. 5, are an example of the CPU 5a and the memory 5b, illustrated in FIG. 8.

The storage unit 5c is an example of hardware configured to store information of various pieces of data, programs, and the like. Examples of the storage part 5c include various storage devices (memories) such as: magnetic disk devices such as a hard disk drive (HDD); semiconductor drive devices such as a solid state drive (SSD); and non-volatile memories such as a flash memory and a read only memory (ROM).

The storage unit 5c may, for example, store a program 50 configured to implement all or some of various functions of the computer 5. The CPU 5a may, for example, implement a function(s) of the computer 5 by decompressing the program 50, stored in the storage unit 5c, onto the memory 5b and executing it. The interface unit 5d is an example of a communication interface configured to, for example, control connection to and communication through a network and the like.

Examples of the interface unit 5d include adaptors compatible or compliant with LAN, Infiniband, Fibre Channel (FC), Universal Serial Bus (USB), and Bluetooth (registered trademark). The network device 26 of the host machine 2 and the network device 44 of the client machine 4, illustrated in FIG. 5, are examples of the interface unit 5d, illustrated in FIG. 8. Note that the program 50 may be downloaded to the computer 5 through the interface unit 5d from the network or the like.

The input-output unit 5e may include one or both of an input unit such as a mouse, a keyboard, or operation buttons and an output unit such as a display or a printer. The read unit 5f is an example of a reader configured to read out information of data and a program recorded in a record medium 5g.

The read unit 5f may include a connection client machine or device to which a computer readable record medium 5g is connectable or insertable. Examples of the read unit 5f include an adaptor compliant with USB or the like, a drive device configured to access to a record disk, a card reader configured to access a flash memory such as an SD card.

Note that the record medium 5g may store the program 50. Examples of the record medium 5g include non-temporary record media such as: flexible disks; optical disks such as a CD, a DVD, and a Blu-ray disk; and flash memories such as a USB memory and an SD card.

Note that examples of the CD include a CD-ROM, a CD-R, a CD-RW, and the like. Also, examples of the DVD include a DVD-ROM, a DVD-RAM, a DVD-R, a DVD-RW, a DVD+R, a DVD+RW, and the like. The above-described hardware configuration of the computer 5 is exemplary.

It is therefore possible to, for example, provide more or less hardware in the computer 5 (for example, adding or omitting any blocks), slit a piece of hardware, integrate pieces of hardware in any combination, or add or delete a bus as appropriate. Also, some of the host machine 2, the management machine 3, and the client machine 4 may include a hardware configuration different from the others.

Note that the example of the hardware configuration of the host machine 2 may further include the FPGA 21, illustrated in FIG. 5, and any related devices or circuits, in addition the configuration illustrated in FIG. 8.

1.6 Example of configuration of host machine

Figure 9:
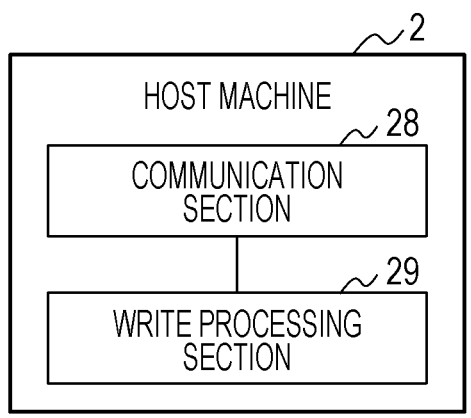
FIG. 9 is a block diagram illustrating an example of the functional configuration of a host machine according to the embodiment.

Next, an example of the functional configuration of the host machine 2 according to the embodiment will be described with reference to FIG. 9. As illustrated in FIG. 9, the host machine 2 exemplarily includes a communication section 28 and a write processing section 29. The communication section 28 communicates with the management machine 3 and the client machine 4 through the network device 26 or through the communication line 1b, illustrated in FIG. 5.

The communication with the client machine 4 may include transmission and reception of a request or data related to the operation of the processing circuit 22. The communication with the management machine 3 may include transmission and reception of a request or data related to write of the processing circuit 22, the encryption device 23, and the ID 24. The write processing section 29 is used when the host machine 2 writes the processing circuit 22, the encryption device 23, and the ID 24 under control of the management machine 3.

The host machine 2 may not include the write processing section 29 in the case where the management machine 3 writes the processing circuit 22, the encryption device 23, and the ID 24 to the FPGA 21. The write processing section 29 writes logics to the FPGA 21 by using a function of the OS or a driver.

For example, based on a command from the management machine 3 to implement an accelerator on the FPGA 21, the write processing section 29 may write the logic of the accelerator to the FPGA 21 through the control line 27, illustrated in FIG. 5. In that case, the communication section 28 may receive the accelerator implementation command from the management machine 3, and transmit a notification of completion of the implementation of the accelerator to the management machine 3 upon completion of the write process by the write processing section 29.

In other words, the write processing section 29 is an example of a configuration section configured to configure the processing circuit 22 and the encryption device 23 in the FPGA 21 based on a processing IP core 34 and an encryption IP core 35 (see FIG. 10) received from the management machine 3.

Note that the write processing section 29 may perform the accelerator logic synthesis. In that case, the write processing section 29 may acquire the information of the processing IP core, the encryption IP core (this may include the information of the encryption key, for example), and the ID from the FPGA 21 through the communication section 28.

The CPU 5a of the host machine 2 (for example, the CPU 2a, illustrated in FIG. 5) may execute the program 50 stored in the memory 5b (for example, the memory 2b, illustrated in FIG. 5) to implement the above-described function of the host machine 2.

1.7 Example of Configuration of Management Machine

Next, an example of the functional configuration of the management machine 3 according to the embodiment will be described with reference to FIGS. 10 and 11.

Figures 10, 11:
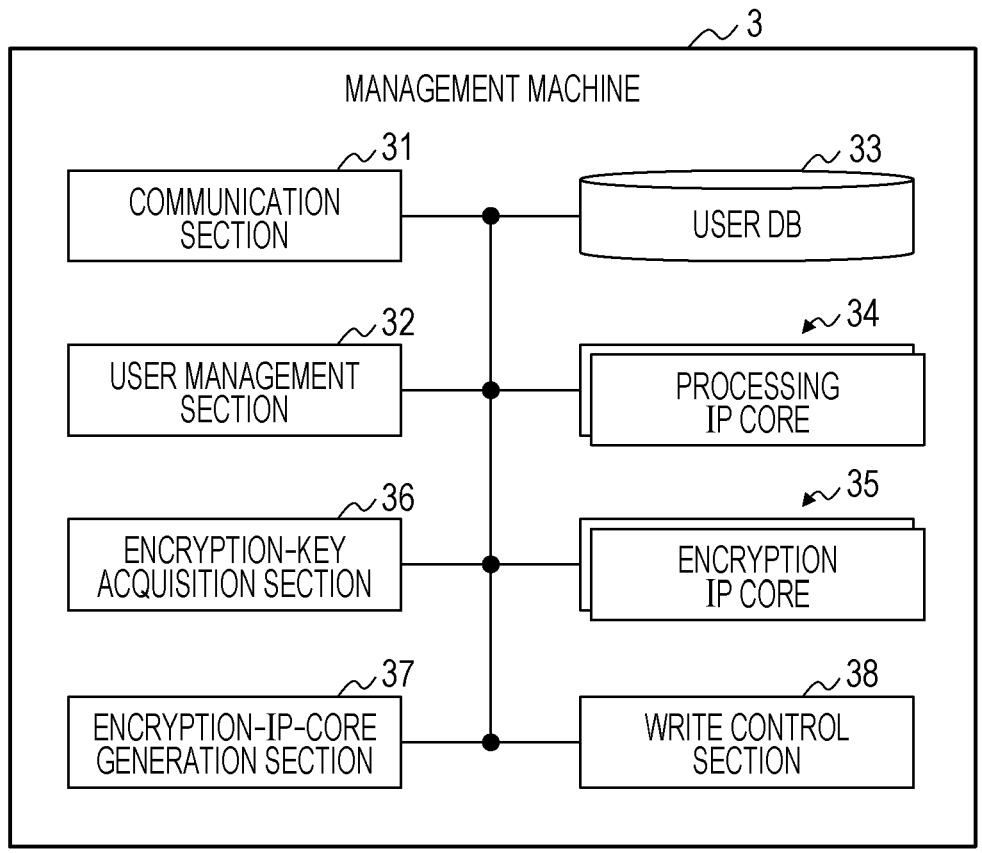
FIG. 10 is a block diagram illustrating an example of the functional configuration of a management machine according to the embodiment.
FIG. 11 is a diagram illustrating an example of the data configuration of a user database (DB)

As illustrated in FIG. 10, the management machine 3 exemplarily includes a communication section 31, a user management section 32, a user DB 33, one or more processing IP cores 34, one or more encryption IP cores 35, an encryption-key acquisition section 36, an encryption-IP-core generation section 37, and a write control section 38.

The communication section 31 communicates with the host machine 2 and the client machine 4. The communication with the host machine 2 may include transmission and reception of a request or data related to write of the processing circuit 22, the encryption device 23, and the ID 24 through a network not illustrated or through the dedicated line 1a or the communication line 1b, illustrated in FIG. 5.

The communication with the client machine 4 may include transmission and reception of information on the provision of the service such for example as user information, information on the logic of the accelerator, and information on the encryption key. The user management section 32 manages the users of the cloud service. For example, the user management section 32 may manage the users in association with IP cores and encryption keys based on the user DB 33.

The user management section 32 may also perform authentication for a service request from the client machine 4, a process of managing a received IP core as a processing IP core 34 or an encryption IP core 35, update the user DB, and so on. The user DB 33 is an example of a database managing information on each user. The user DB 33 may be implemented by, for example, the memory 5b or the storage unit 5c (see FIG. 8).

FIG. 11 illustrates an example of the data configuration of the user DB. As exemplarily illustrated in FIG. 11, the user DB 33 may contain information of user ID, service ID, encryption key, processing IP core, and encryption IP core.

The user ID is an example of information identifying the user, for example, the application 41. The service ID is an example of information identifying the service utilized by the user. For example, the ID of an area allocated in the FPGA 21 or the ID of an accelerator may be used as the service ID.

The encryption key may be the information of an encryption key itself or information that allows identification of an encryption key acquired by the encryption-key acquisition section 36. The processing IP core and the encryption IP core may be the very information of these IP cores acquired by the user management section 32 or the encryption-IP-core generation section 37, or information that allows identification of these IP cores.

Note that in the case where the service ID is the ID of an area in the FPGA 21 or the ID of an accelerator, the user DB 33 may not contain the information of the processing IP core and/or the encryption IP core as long as the processing IP core and/or the encryption IP core is identifiable from the ID.

In other words, the user management section 32 is an example of a management section configured to manage each encryption key in association with the corresponding processing circuit 22. Also, the communication section 31 is an example of a notification section configured to notify the client machine 4 of the encryption key for the processing circuit 22.

The processing IP core 34 is, for example, an IP core received from the client machine 4 for generating the processing circuit 22. The encryption IP core 35 is an IP core for generating the encryption device 23 and may be, for example, an encryption IP core received from the client machine 4, the information of an encryption IP core generated by the encryption-IP-core generation section 37, the information of an encryption IP core stored in advance, or the like.

The processing IP core 34 and the encryption IP core 35 may be, for example, held in the memory 5*b*, the storage unit 5*c*, or the like until logic synthesis is performed. Also, since an IP core is a reusable functional block, one or both of the processing IP core 34 and the encryption IP core 35 may be, for example, kept stored in the memory 5*b*, the storage unit 5*c*, or the like even after logic synthesis if they are likely to be reused.

The encryption-key acquisition section 36 acquires the encryption key to be used in the encryption or decryption by the encryption device 23 and the decryption by the client machine 4. To acquire the encryption key, the encryption-key acquisition section 36 may receive the encryption key from the client machine 4 along with the information of the encryption IP core 35. Alternatively, the encryption-key acquisition section 36 may generate the encryption key by a known method.

The generated encryption key may be, for example, held in the memory 5*b*, the storage unit 5*c*, or the like until logic synthesis is performed. The encryption-IP-core generation section 37 generates the encryption IP core 35.

For example, the encryption-IP-core generation section 37 may generate an encryption IP core 35 containing the encryption key acquired by the encryption-key acquisition section 36 as a key for encryption, and hold the encryption IP core 35 in the memory 5*b*, the storage unit 5*c*, or the like. Alternatively, the encryption-IP-core generation section 37 may set the encryption key acquired by the encryption-key acquisition section 36 as a key for encryption in an encryption IP core held in advance in the memory or the like.

Note that the encryption-IP-core generation section 37 may not be included in the case where the client machine 4 transmits its encryption IP core 35 with a key for encryption set therein. In other words, one or both of the user management section 32 and the encryption-IP-core generation section 37 are an example of an acquisition section configured to acquire the first information to be used to configure the processing circuit 22 and the second information to be used to configure the encryption device 23.

Also, the communication section 31 is an example of a receiver configured to receive a request to configure the processing circuit 22 in the FPGA 21 from the client machine 4. The write control section 38 performs logic synthesis on the processing IP core 34 and the encryption IP core 35 and performs control to write the processing circuit 22 and the encryption device 23 to the FPGA 21.

Note that, as mentioned above, various methods are available for implementing the control by the write control section 38 to configure an accelerator such as the processing circuit 22 and the encryption device 23 in the FPGA 21. For example, the write control section 38 may write the accelerator to the FPGA 21 through the dedicated line 1*a* (see FIG. 5).

Alternatively, the write control section 38 may command the OS run by the CPU 2*a* of the host machine 2 through the communication line 1*b* (see FIG. 5) to implement the accelerator in the FPGA 21. In other words, the write control section 38 is an example of a control section configured to perform control to configure the processing circuit 22 and the encryption device 23 in the FPGA 21 based on the first information to be used to configure the processing circuit 22 and the second information to be used to configure the encryption device 23.

The CPU 5*a* (see FIG. 8) of the management machine 3 may execute the program 50, stored in the memory 5*b*, to implement the above-described functions of the management machine 3.

1.8 Example

Figure 12:
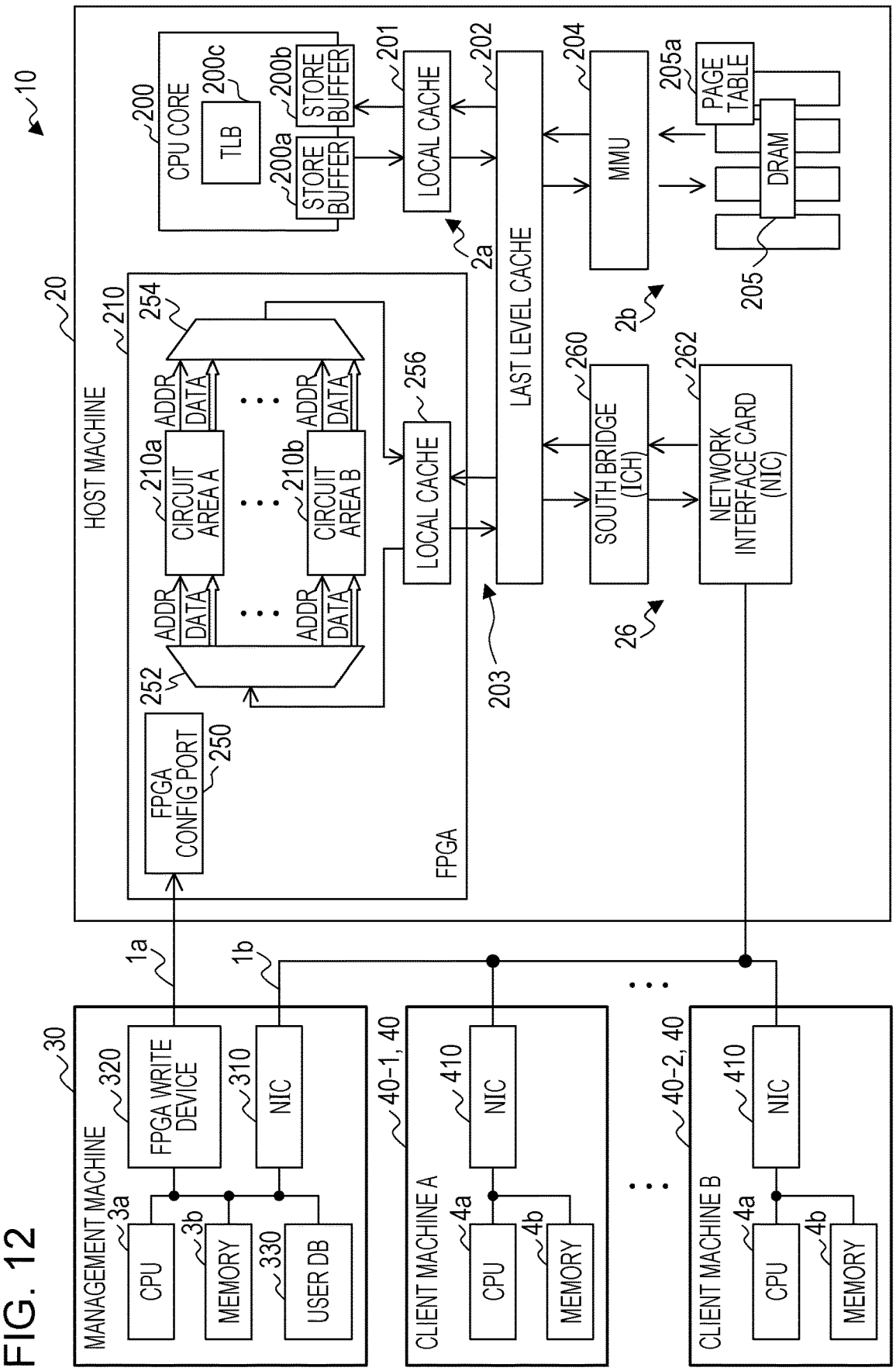
FIG. 12 is a block diagram illustrating the configuration of an information-processing system according to an example of the embodiment.
Figure 13:
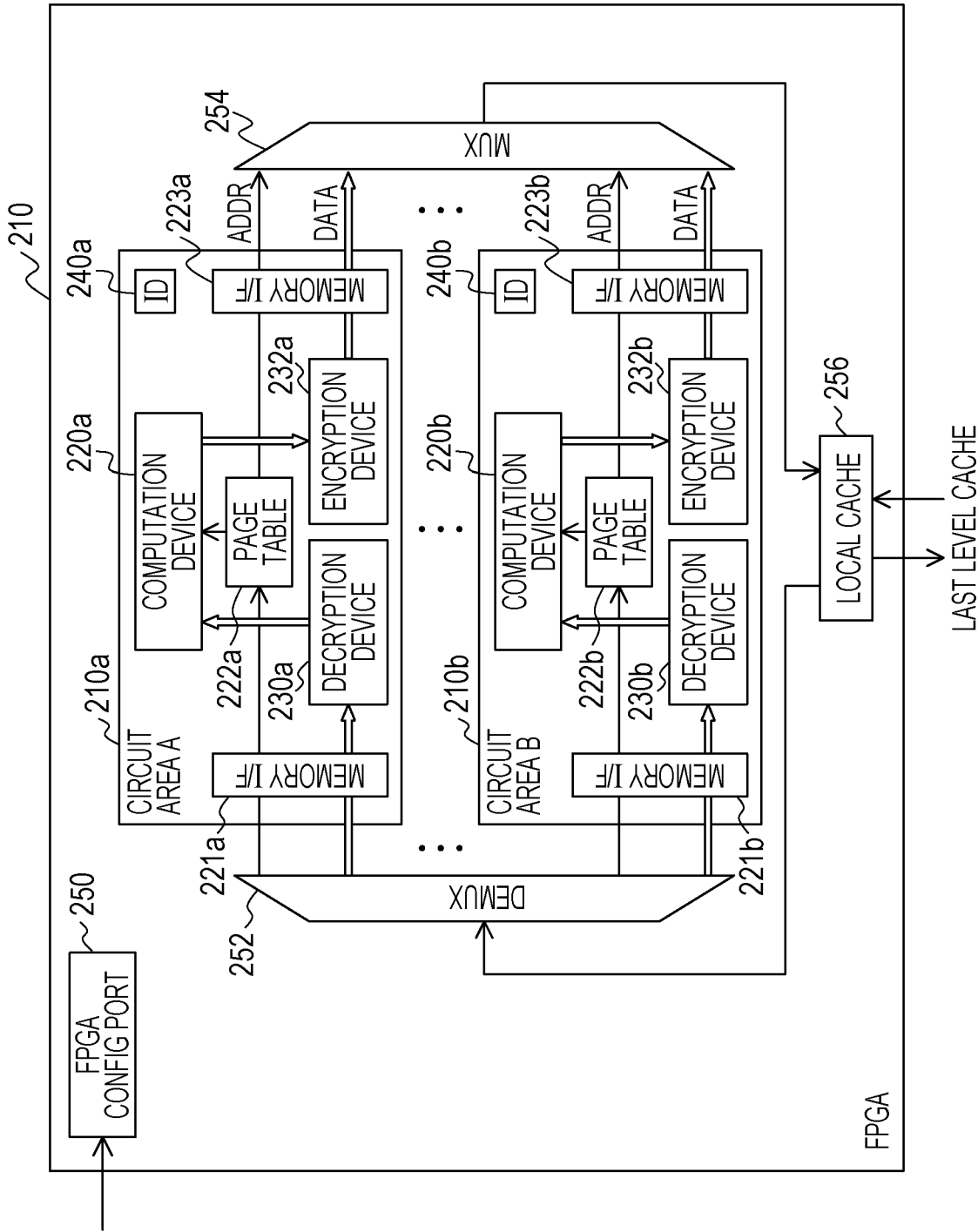
FIG. 13 is a block diagram illustrating an example of the configuration of an FPGA illustrated in FIG. 12.

Next, an example of the information-processing system 1 according to the embodiment will be described with reference to FIGS. 12 and 13. FIG. 12 is a block diagram illustrating the configuration of an information-processing system 10 according to an example of the embodiment. FIG. 13 is a block diagram illustrating an example of the configuration of an FPGA 210 illustrated in FIG. 12.

As illustrated in FIG. 12, the information-processing system 10 exemplarily includes a host machine 20, a management machine 30, and a plurality (two in the example of FIG. 12) of client machines 40-1 and 40-2.

Note that the information-processing system 10 may include a plurality of host machines 20 and/or a plurality of management machines 30, and the information-processing system 10 may include three or more client machines 40. The host machine 20 exemplarily includes a CPU core 200, a local cache 201, a last level cache 202, and a cache coherent bus 203. The host machine 20 exemplarily further includes a memory management unit (MMU) 204, a dynamic RAM (DRAM) 205, the FPGA 210, a south bridge 260, and a network interface card (NIC) 262.

Note that the host machine 20 may include a plurality of CPU cores 200 and/or a plurality of FPGAs 210. The CPU core 200 may include a store buffer 200*a*, a load buffer 200*b*, and a TLB 200*c*. The store buffer 200*a* may be used as a buffer for data to be stored in the local cache 201. The load buffer 200*b* may be used as a buffer for data to be loaded from the local cache 201.

The TLB 200c may store part of information in a page table 205a stored in the DRAM 205, for example, a translation table for frequently used addresses. The local cache 201 is a cache provided for each CPU core 200 and may be positioned as an L1 cache, for example. The CPU core 200 and the local cache 201 are an example of the CPU 2a, illustrated in FIG. 5.

The last level cache 202 is a cache provided between the CPU core 200 and FPGA 210 and the MMU 204 and may be positioned as a cache at the last level, for example.

The last level cache 202 may provide the cache coherent bus 203 between the CPU core 200 and the FPGA 210. In other words, the CPU core 200 and the FPGA 210 are treated as equivalent processors in the host machine 20. The MMU 204 processes memory access requested by the CPU core 200 or the FPGA 210.

The MMU 204 may have, for example, a cache control function, a bus arbitration function, and the like. The DRAM 205 is a memory that functions as a main storage device (memory) for the host machine 20. In an example, the DRAM 205 may be a memory module equipped with a plurality of DRAM chips, for example, a dual inline memory module (DIMM).

Note that FIG. 12 illustrates an example where the DRAM 205 includes four DIMMs. The DRAM 205 is an example of the memory 2b, illustrated in FIG. 5. The DRAM 205 may store the page table 205a to be used by the OS of the host machine 20.

Note that the page table 205a is an example of information managing memory allocation. The FPGA 210 is an example of the FPGA 21, illustrated in FIG. 5. As illustrated in FIG. 12, the FPGA 210 exemplarily includes a plurality (two in the example of FIG. 12) of circuit areas 210a and 210b, an FPGA config port 250, a demultiplexer (DEMUX) 252, a multiplexer (MUX) 254, and a local cache 256.

In the circuit areas 210a and 210b are configured, for example, logical circuits to be utilized by the user of the client machine 40-1 and logical circuits to be utilized by the user of the client machine 40-2, respectively. Details of the circuit areas 210a and 210b will be described later.

The FPGA config port 250 is a port used in configuring the logical circuits in the FPGA 210. The management machine 30 may configure the logical circuits in the FPGA 210 by accessing the FPGA config port 250 through the dedicated line 1a. In other words, the FPGA config port 250 is an example of a connection unit to be connected to the management machine 30, and the management machine 30 configures the processing circuit 22 and the encryption device 23 in the FPGA 210 through the FPGA config port 250.

The demultiplexer 252 is a circuit configured to deliver an input signal to one of a plurality of outputs. For example, the demultiplexer 252 outputs the information of an address and data inputted from the local cache 256 to one of the circuit areas 210a and 210b. The multiplexer 254 is a circuit configured to select one of a plurality of inputs and output that signal, and is an example of a selector.

For example, the multiplexer 254 selects the information of an address and data inputted from the circuit area 210a or the information of an address and data inputted from the circuit area 210b and outputs the selected information to the local cache 256.

The local cache 256 is a cache provided for each FPGA 210. The local cache 256 may be connected to the cache coherent bus 203 along with the local cache 201. The south bridge 260 is an example of an integrated circuit (IC) including a chipset that functions as a peripheral circuit for a processor.

In the example of FIG. 12, the south bridge 260 is a controller configured to control a peripheral device such as the NIC 262. Meanwhile, examples of the south bridge 260 include an input/output controller hub (ICH). The NIC 262 is a device configured to connect the host machine 20 to a network such as a LAN.

The NIC 262 is an example of the network device 26, illustrated in FIG. 5. The NIC 262 may be, for example, connected by a wire or wirelessly to each of the management machine 30 and the client machine 40. The management machine 30 exemplarily includes a CPU 3a, a memory 3b, an NIC 310, an FPGA write device 320, and a user DB 330. The CPU 3a and the memory 3b are an example of the CPU 5a and the memory 5b, illustrated in FIG. 8.

The user DB 330 is an example of a database managing information on each user, and may have a similar data configuration to the user DB 33, illustrated in FIG. 10. The NIC 310 is a device configured to connect the management machine 30 to a network such as a LAN. The NIC 310 may be, for example, connected by a wire or wirelessly to each of the host machine 20 and the client machine 40.

Note that, with the NIC 310, the management machine 30 may command the OS run by the CPU core 200 of the host machine 20 through the communication line 1b to implement an accelerator in the FPGA 210.

The FPGA write device 320 performs control to write an accelerator to the circuit area 210a or 210b in the FPGA 210 at the FPGA config port 250, included in the FPGA 210 of the host machine 20, through the dedicated line 1a.

Note that various known methods are available for implementing the write of an accelerator to the FPGA 210. The client machine 40 exemplarily includes a CPU 4a, a memory 4b, and an NIC 410. The CPU 4a and the memory 4b are an example of the CPU 5a and the memory 5b, illustrated in FIG. 8.

The NIC 410 is a device configured to connect the client machine 40 to a network such as a LAN. The NIC 410 may be, for example, connected by a wire or wirelessly to each of the host machine 20 and the management machine 30. Next, an example of the configuration of the FPGA 210 of the host machine 20 will be described.

As illustrated in FIG. 13, in each of the circuit areas 210a and 210b are exemplarily configured a computation device 220, memory interfaces 221 and 223, a page table 222, a decryption device 230, and an encryption device 232. The computation device 220 is an example of the processing circuit 22, illustrated in FIG. 5. The computation device 220 may include a logic which, for example, has been designed by the corresponding user.

As a processor, the computation device 220 may run the OS along with the CPU core 200. The memory interfaces 221 and 223 provide interfaces to the DRAM 205. For example, the memory interface 221 outputs an address and data from the DRAM 205, selected by the demultiplexer 252, to the page table 222 and the decryption device 230, respectively.

Also, the memory interface 223 outputs an address outputted from (or passing through) the page table 222 and data outputted from the encryption device 232 to the multiplexer 254. The page table 222 is used for virtual-physical address translation by the computation device 220. For example, the computation device 220 may copy the page table 205a, stored in the DRAM 205, and store it in the page table 222.

The page table 222 is an example of management information managing an address in the DRAM 205.

The decryption device 230 decrypts encrypted data inputted from the memory interface 221 by using an encryption key associated with the computation device 220, and outputs the decrypted data to the computation device 220.

The encryption device 232 encrypts data outputted from the computation device 220 by using the encryption key associated with the computation device 220. The encrypted data is outputted to the memory interface 223. In other words, the decryption device 230 and the encryption device 232 are an example of the encryption device 23, illustrated in FIG. 5.

An ID 240 is an example of the ID 24, illustrated in FIG. 5. The ID 240 may be set as an ID of the circuit area 210a or 210b or of the accelerator (for example, the computation device 220).

This ID 240 may be used to identify the computation device 220 utilized by the user. Here, the encryption key used by the decryption device 230 and the encryption device 232 is managed by the management machine 30 in association with the computation device 220 and notified to the user of the computation device 220.

Thus, the user of the computation device 220 may use its encryption key to decrypt the result of computation of the computation device 220, which is stored in the DRAM 205. However, a different user, who does not have the encryption key, may succeed in acquiring the computation result but fail to properly decrypt it.

As described above, with the method according to the embodiment, the information-processing system 10, illustrated in FIGS. 12 and 13, also does not allow others to steal data, thereby lowering the security risk.

1.9 Modification

Next, a modification of the embodiment will be described. In the embodiment, the management machine 3 receives from the client machine 4 an IP core prepared by its user, and configures the processing circuit 22 in the FPGA 21 based on this IP core.

Figure 14:
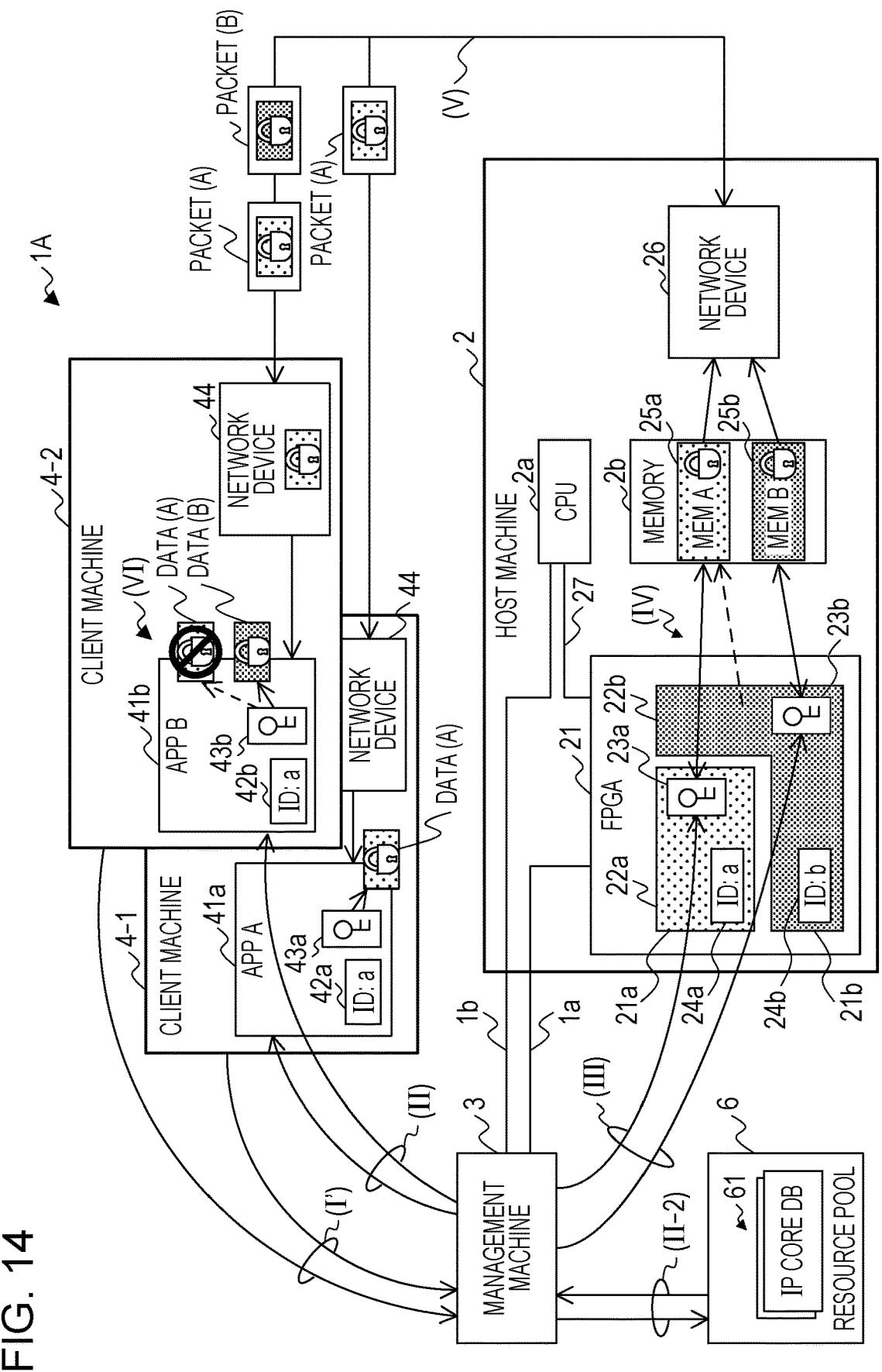
FIG. 14 is a block diagram illustrating the configuration of an information-processing system according to a modification.

Here, an IP is a reusable functional block, as mentioned above. In a service utilizing an FPGA, an IP is reusable. Then, an IP previously designed by a user may be reused as a functional block as is by this user or a different user, or a functional block may be created by re-using the IP and sold. In view of this, in a modification of the embodiment, an information-processing system 1A may include a resource pool 6 for IP cores, as illustrated in FIG. 14.

Note that the information-processing system 1A may include a host machine 2 and a client machine 4 similar to those of the information-processing system 1, illustrated in FIG. 5, and include a management machine 3A that functions partly differently from that of the information-processing system 1.

The resource pool 6 is an example of a storage apparatus configured to hold a plurality of IP cores, that is, a plurality of pieces of first information corresponding to a plurality of types of processing circuits 22. Note that the resource pool 6 may further hold second information to be used to configure an encryption device 23.

Examples of the resource pool 6 include various computers such as a server and a PC. The resource pool 6 may have a similar hardware configuration to the computer 5, illustrated in FIG. 8. Note that the resource pool 6 may include a plurality of HDDs or SSDs as its storage unit 5c, and they may be used to configure, for example, redundant arrays of inexpensive disks (RAID) or the like.

As illustrated in FIG. 14, the resource pool 6 may exemplarily include an IP core DB 61. In the IP core DB 61, a plurality of IP cores are registered. In response to a request from the management machine 3A, an IP core requested may be read out from the IP core DB 61 and transmitted to the management machine 3A.

Note that the IP core DB 61 may be implemented by a storage such for example as the storage unit 5c. For example, vendors of the FPGA 21 and other providers may register IP cores in the resource pool 6 and sell or provide the registered IP cores.

The client machine 4 may transmit to the management machine 3A information on the processing circuit 22 to be configured in the FPGA 21 such as information on what processes are to be implemented, for example, a processing sequence, and information identifying the IP core.

In the case where the client machine 4 transmits a processing sequence, the management machine 3A may select an IP core from the resource pool 6 based on the processing sequence received, and let the application 41 utilize the processing circuit 22 that is based on the selected IP core.

Alternatively, the client machine 4 may, for example, select an IP core desired to be utilized from among the IP cores registered in the resource pool 6, and register utilization of the processing circuit 22 that is based on the selected IP core in the management machine 3A.

The management machine 3A may control and manage the write of the processing circuit 22 that is based on the IP core requested by the client machine 4 to the FPGA 21 of the host machine 2 to be utilized by the user of the client machine 4.

Meanwhile, for the encryption device 23, the management machine 3A may use a similar method to the embodiment to acquire the encryption IP core 35 and write it to the FPGA 21. Alternatively, the management machine 3A may also acquire the encryption IP core from the resource pool 6.

Note that the host machine 2, the management machine 3A or the resource pool 6 or any combination thereof may be installed at a facility such as a datacenter. Next, an example of the operation of the information-processing system 1A with the above-described configuration will be described with reference to FIGS. 14 and 15.

Note that the description will be given below of the part of the operation differing from the information-processing system 1 according to the embodiment. As indicated by arrow (I') in FIG. 14, for example, the application 41a of the client machine 4-1 requests the management machine 3A for a service using the FPGA 21 and transmits a processing sequence desired to be utilized. The management machine 3A acquires the ID of the service and the encryption key, which is based, for example, on a symmetric encryption method, and transmits the ID and the encryption key to the application 41a (see arrow (II)).

The application 41a stores the ID and the encryption key received as the ID 42a and the encryption key 43a, respectively. In a specific example, as illustrated in FIG. 15, the client machine 4 transmits a service request to the management machine 3A (process T1), is authenticated by the management machine 3A (process T2), and is provided with the ID 42 (process T3).

The client machine 4 then transmits the processing sequence to the management machine 3A (process T31). The management machine 3A acquires the encryption key 43 (process T5) and provides the acquired encryption key 43 to the client machine 4 (process T6). Then, as indicated by arrow (II-2) in FIG. 14, the management machine 3A, after receiving the processing sequence, accesses the resource pool 6, which is connected thereto by a network not illustrated, and picks up the IP core that matches the processing sequence from the IP core DB 61 (process T32 in FIG. 15).

Figure 15:
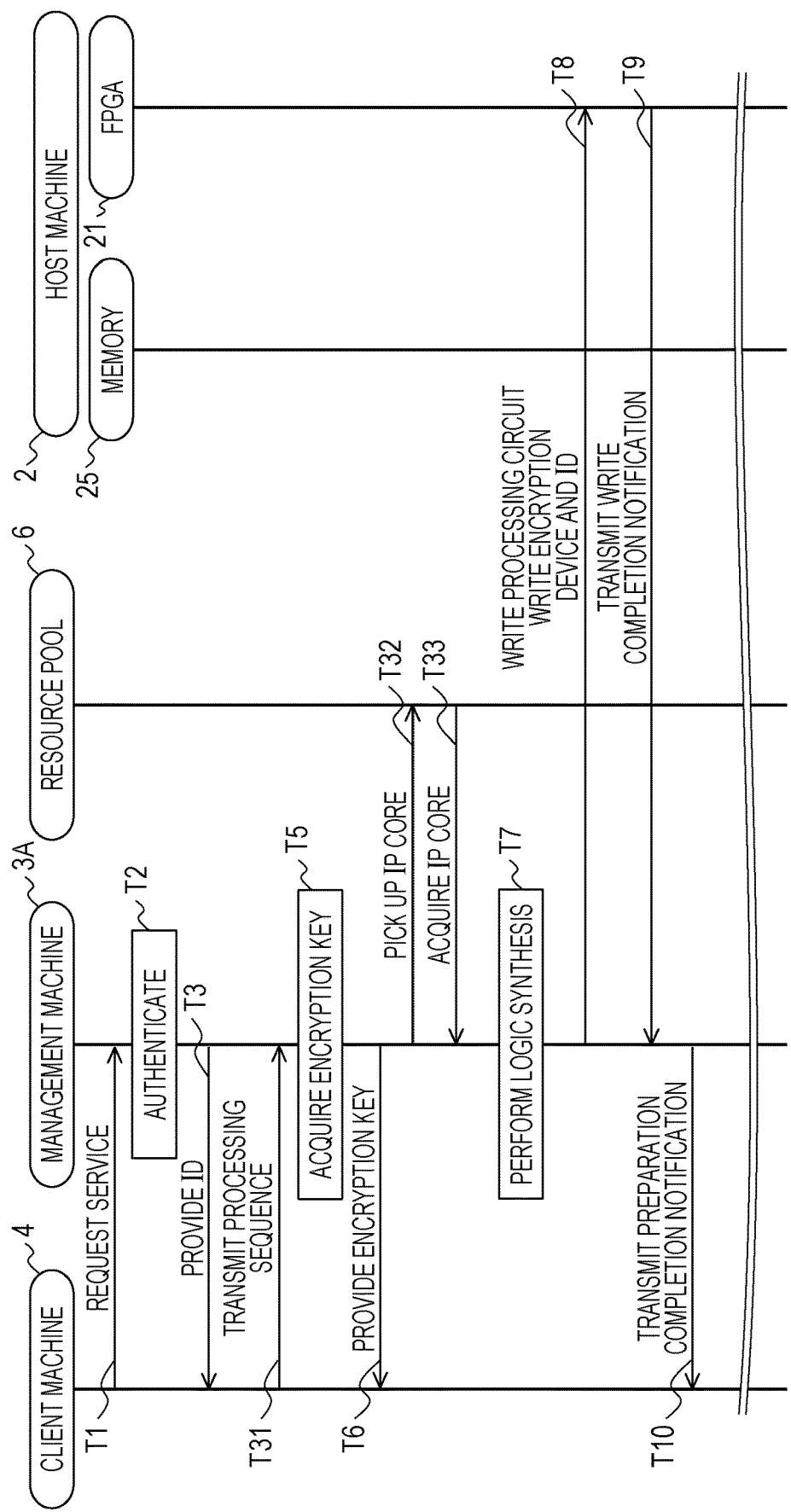
FIG. 15 is a sequence diagram explaining the operation of The information-processing system according to the modification.

The management machine 3A then acquires the picked IP core from the resource pool 6 (process T33 in FIG. 15). The processes at and after arrow (III) in FIG. 14 and the processes at and after process T7 in FIG. 15 may be similar to those by The information-processing system 1 according to the embodiment.

Note that in processes T32 and T33 in FIG. 15, the IP core may be passed directly from the resource pool 6 to the host machine 2. In that case, the write of the IP core to the FPGA 21 in processes T7 to T9 in FIG. 15 may be performed by, for example, the resource pool 6 or the host machine 2, as will be exemplarily described below.

Note that the IP core may include one or both of a processing IP core and an encryption IP core. In an example, the management machine 3A may command the resource pool 6 to transmit the IP core that matches the processing sequence to the host machine 2.

In that case, the resource pool 6 may transmit the designated IP core to the host machine 2 along with a command to write the IP core to the FPGA 21, and the CPU 2*a* of the host machine 2 may write the IP core to the FPGA 21 based on the write command.

Alternatively, in a case where the resource pool 6 and the host machine 2 are connected by a dedicated line, the resource pool 6 may write the designated IP core to the FPGA 21 through the dedicated line.

In other words, the resource pool 6 or the host machine 2 may perform logic synthesis for the IP core. As described above, the information-processing system 1A according to the modification also achieves an advantageous effect similar to the information-processing system 1 according to the embodiment. Also, even in the practice in which vendors of the FPGA 21 and the like provide IP cores as is assumed in the modification, the management machine 3A associates users and processing IP cores with their respective encryption keys, and the encryption keys to be notified to the users are therefore managed properly.

Further, the IP core to be used to write the processing circuit 22 to the FPGA 21 is selected from among the IP cores registered in the resource pool 6.

This also enables, for example, the resource pool 6 or the management machine 3A to determine the security risk in advance for the IP cores registered in the resource pool 6. The security risk is thus lowered further by this determination of the security risk in advance in addition to the methods according to the embodiment and the modification.

Next, an example of the functional configuration of the management machine 3A according to the modification will be described with reference to FIG. 16.

Figure 16:
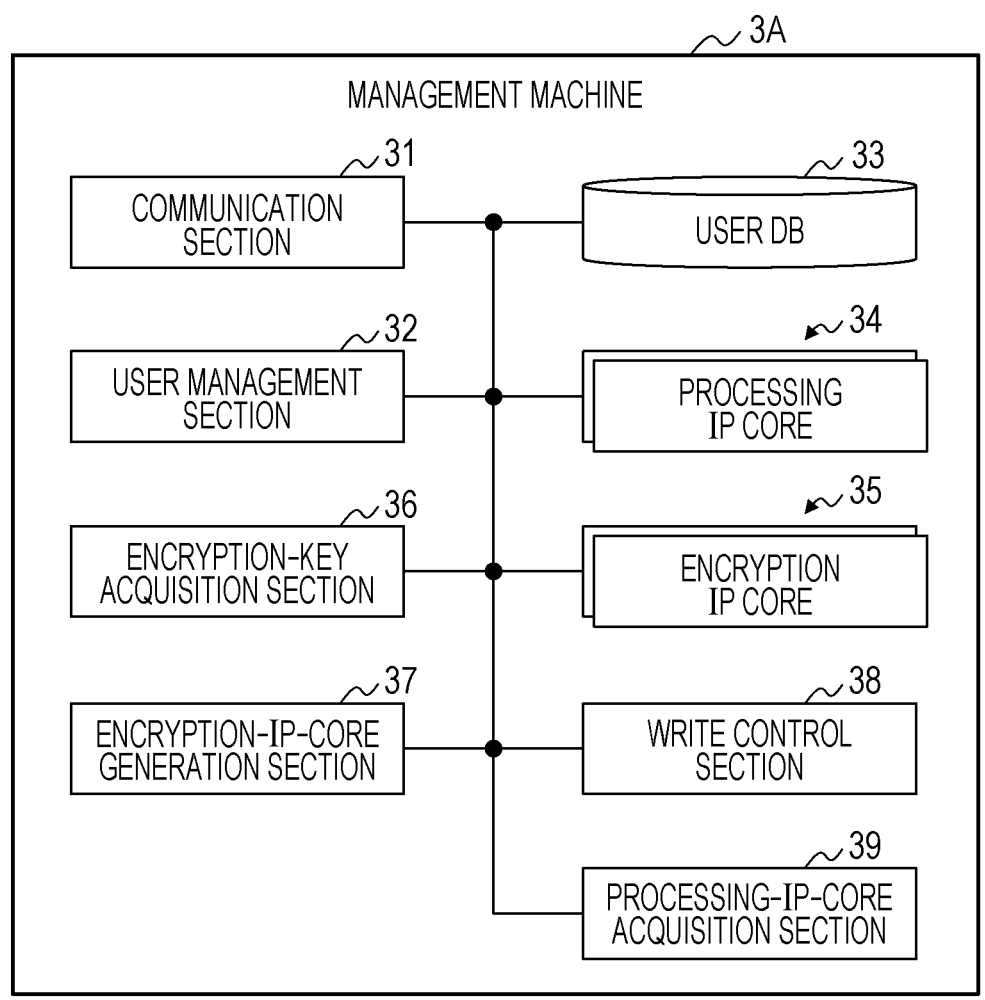
FIG. 16 is a block diagram illustrating the functional configuration of a management machine according to the modification.

FIG. 16 is a block diagram illustrating the functional configuration of the management machine 3A according to the modification. As illustrated in FIG. 16, the management machine 3A exemplarily further includes a processing-IP-core acquisition section 39 in addition to the functional configuration of the management machine 3 illustrated in FIG. 10.

Note that, as in the embodiment, the communication section 31 as an example of a receiver may receive a request to configure the processing circuit 22 in the FPGA 21 from the client machine 4. The processing-IP-core acquisition section 39 acquires a processing IP core requested by the client machine 4 from the resource pool 6, which holds a plurality of processing IP cores to be used to configure a plurality of types of processing circuits 22.

Note that the processing IP core requested by the client machine 4 may be identified by the processing-IP-core acquisition section 39 based on the processing sequence received from the client machine 4, or may be a processing IP core selected by the client machine 4 by referring to the resource pool 6. For example, the processing-IP-core acquisition section 39 may perform the processes described as processes T32 and T33 in FIG. 15.

Note that the processing-IP-core acquisition section 39 may store the acquired processing IP core in the memory 5*b* or the storage unit 5*c* as the processing IP core 34. Note that the management machine 3A may acquire the processing IP core 34 and also the encryption IP core 35 from the resource pool 6.

In other words, the processing-IP-core acquisition section 39 is an example of an acquisition section configured to acquire one or both of the first information that satisfies the request from the client machine 4 and the second information from the resource pool 6. The write control section 38 may perform control to configure the processing IP core 34 and the encryption IP core 35 acquired by the management machine 3A in the FPGA 21.

Note that in a case where the processing IP core is passed directly from the resource pool 6 to the host machine 2, the management machine 3A may perform control to configure the processing circuit 22 in the FPGA 21 by using a command for the resource pool 6 to transmit the processing IP core to the host machine 2. Also, in a case where the encryption IP core is passed directly from the resource pool 6 to the host machine 2, the management machine 3A may perform control to configure the encryption device 23 in the FPGA 21 by using a command for the resource pool 6 to transmit the encryption IP core to the host machine 2.

These transmission commands may be issued using the function of the communication section 31, the write control section 38 or the processing-IP-core acquisition section 39 or any combination thereof.

In other words, the communication section 31, the write control section 38 or the processing-IP-core acquisition section 39 or any combination thereof is an example of a control section configured to perform control to configure the processing circuit 22 and the encryption device 23 in the FPGA 21 based on the first information to be used to configure the processing circuit 22 and the second information to be used to configure the encryption device 23.

Note that whether to cause the management machine 3A to acquire the processing IP core and/or the encryption IP core from the resource pool 6 or to cause the resource pool 6 to directly transmit the processing IP core and/or the encryption IP core to the host machine 2 may be determined based on the functions of the resource pool 6 and the host machine 2, the condition of storage of IP cores in the IP core DB 61, the operation condition, or the like.

Figure 17:
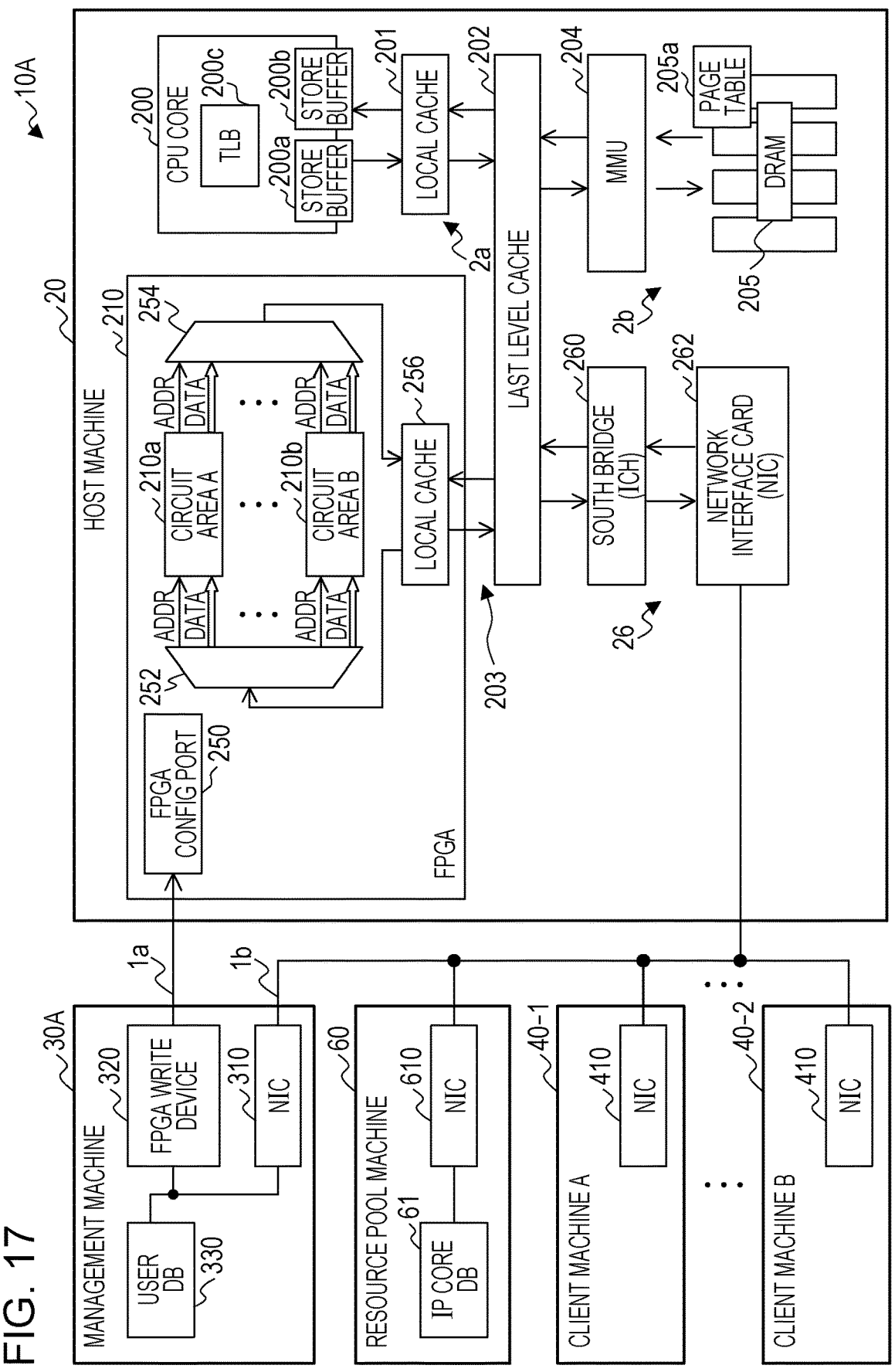
FIG. 17 is a block diagram illustrating the configuration of an information-processing system according an example of the modification.

Next, an example of the information-processing system 1A according to the modification will be described with reference to FIG. 17. FIG. 17 is a block diagram illustrating the configuration of an information-processing system 10A according to an example of the modification.

Note that, for the sake of convenience, FIG. 17 omits illustration of the CPU 3*a* and the memory 3*b* in a management machine 30A, the CPU 4*a* and the memory 4*b* in each of the client machines 40-1 and 40-2, and a CPU and a memory in a resource pool machine 60.

The description will be given below of the part of the configuration differing from the information-processing system 1 according to the embodiment. As illustrated in FIG. 17, the information-processing system 10A may exemplarily include the resource pool machine 60 in addition to the configuration of the information-processing system 10.

The resource pool machine 60 may include an IP core DB 61 similar to that illustrated in FIG. 14. The resource pool machine 60 may further include an NIC 610. The NIC 610 is a device configured to connect the resource pool machine 60 to a network such as a LAN. The NIC 610 may be, for example, connected by a wire or wirelessly to the management machine 30A and also to the host machine 20 or the client machine 40.

2. Other Matters

The techniques according the embodiment and the modification described above may be implemented with the following changes and modifications. For example, each functional block of the host machine 2 illustrated in FIG. 9 may be integrated with the other or divided.

Moreover, each functional block of the management machine 3 illustrated in FIG. 10 may be integrated with others in any combination or divided. Also, in the modification, the information-processing system 1A includes the management machine 3A and the resource pool 6. However, the configuration is not limited to this.

The function of one of the management machine 3A and the resource pool 6 may be integrated in the other apparatus, or part of the functions of the management machine 3A and the resource pool 6 may be gathered in one or more computers. In that case, the above-mentioned other apparatus or computer may be positioned as the management apparatus configured to manage the host machine 2.

In the embodiment and the modification, a plurality of processing circuits 22 and a plurality of encryption devices 23, in particular, two processing circuits 22 and two encryption devices 23 are configured in the FPGA 21. However, the number of logical circuits configured in a single FPGA 21 may be one, three, or more.

In the case where a plurality of logical circuits are formed in a single FPGA 21, mutually different address areas in the memory 2b, for example, mutually different memories 25 may be allocated to the plurality of processing circuits 22 in the FPGA 21.

Also, in the embodiment and the modification, the host machine 2 may include a plurality of FPGAs 21, and one or more processing circuits 22 and one or more encryption devices 23 may be configured in each of the plurality of FPGAs 21.

In that case too, mutually different address areas in the memory 2b may be allocated to the plurality of processing circuits 22 in the plurality of FPGAs 21. Further, although the embodiment and the modification have been described such that the processing circuit 22 and the encryption device 23 configured in the FPGA 21 are equal to each other in number, the configuration is not limited to this.

For example, among a plurality of processing circuits 22 configured in the FPGA 21, at least one processing circuit 22 may have its computation result encrypted by the encryption device 23. To describe this by using the configuration example in FIGS. 12 and 13, the FPGA 210 may include a plurality pairs of the computation device 220, configured to perform computation according to inputted information, and the page table 222, managing an address in the DRAM 205.

Also, at least one pair among the plurality of pairs may further include the encryption device 23, for example, the decryption device 230 and the encryption device 232, configured to generate encrypted data by encrypting a computation result computed by the computation circuit 220 of the at least one pair, by using an encryption key for this computation circuit 220.

Moreover, the computation circuit 220 of the at least one pair may write encrypted data to the DRAM 205 at the address that is based on the page table 222 of the at least one pair, the encrypted data being obtained by the encryption device 232 through encryption of the computation result of the computation circuit 220 of the at least one pair.

On the other hand, the computation circuit 220 of each pair other than the at least one pair may write its computation result to the DRAM 205 at the address that is based on the page table 222 of the corresponding pair.

According to such a configuration, even if, for example, the FPGA 21 does not include the encryption device 23 or an malicious IP is configured not to use the encryption device 23, the malicious IP will fail to steal and view data in a memory 25 used by a different processing circuit 22 as long as this different processing circuit 22 is configured to use the encryption device 23.

In other words, even if a malicious IP re-writes the address in the page table 222 used by the malicious IP to a different address or reads out the address in the page table 222 and then changes it to a different address, the malicious IP will fail to steal and view data in the different processing circuit 22 at this different address.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information-processing system comprising:
a host system with a first processor, an encryption circuit and an integrated circuit capable of reconfiguration of circuits, the first processor being coupled to the integrated circuit;
a shared memory coupled to the first processor and the integrated circuit;
a second processor, and a memory coupled to the second processor, the second processor being configured to access the first processor; and
a computer, separate from the host system, with a third processor configured to manage the first processor, wherein
the first processor is configured to write, to the integrated circuit, a processing circuit, an encryption circuit and identification information for at least an area of the processing circuit,
the processing circuit is configured to perform processing, according to information transmitted by the second processor, to provide a service using the identification information,
the encryption circuit is configured to generate encrypted data by encrypting a processing result of the processing circuit, by using an encryption key for the processing circuit, the third processor is configured to manage the encryption key in association with the processing circuit and to notify the second processor of the encryption key for the processing circuit, and the second processor is configured to read out the encrypted data from the memory for storing the encrypted data, and decrypt the read encrypted data by using the encryption key notified from the third processor.

2. The information-processing system according to claim 1, wherein the first processor is configured to write the processing circuit and the encryption circuit based on first information to be used to write the processing circuit and second information to be used to write the encryption circuit, the first information and the second information being received from the third processor.

3. The information-processing system according to claim 1, wherein the third processor is configured to control to write the processing circuit and the encryption circuit to the integrated circuit based on first information to be used to write the processing circuit and second information to be used to write the encryption circuit.

4. The information-processing system according to claim 1, wherein the encrypted data generated by the encryption circuit is written to the shared memory based on management information managing an address in the shared memory.

5. An information-processing apparatus communicating with a management machine, separate from the information-processing apparatus, to manage the information-processing apparatus, and a client machine configured to access the information-processing apparatus, the information-processing apparatus comprising:

an integrated circuit capable of re-configuration of circuits; and a first processor configured to write, to the integrated circuit, a processing circuit configured to perform processing according to input information and an encryption circuit configured to generate encrypted data by encrypting a processing result, generated by the processing circuit in providing a service using identification information for at least an area of the processing circuit, by using an encryption key for the processing circuit supplied by the management machine, wherein the management machine is configured to manage the encryption key in association with the processing circuit and to notify the client machine of the encryption key, and the client machine is configured to obtain the encrypted data from the information-processing apparatus and decrypt the encrypted data by using the encryption key notified from the management machine.

6. The information-processing apparatus according to claim 5, further comprising a shared memory coupled to the first processor and the integrated circuit, wherein the encryption key is managed in association with the processing circuit by a third processor in the management machine configured to manage the information-processing apparatus, and wherein the encrypted data is read out by a second processor from the shared memory for storing the encrypted data, and decrypted by the second processor by using the encryption key notified from the third processor.

7. The information-processing apparatus according to claim 5, further comprising a port configured to be coupled to a third processor in the management machine configured to manage the information-processing apparatus, and wherein the processing circuit and the encryption circuit are written to the integrated circuit through the port by the third processor.

8. The information-processing apparatus according to claim 5, wherein the first processor configured to write the processing circuit and the encryption circuit to the integrated circuit based on first information to be used to write the processing circuit and second information to be used to write the encryption circuit.

9. The information-processing apparatus according to claim 5, wherein the integrated circuit includes a plurality of pairs of the processing circuit and management information managing an address in a shared memory, at least one pair or any combination thereof among the plurality of pairs further includes the encryption circuit, the processing circuit of the at least one pair or the any combination writes encrypted data to the shared memory at an address that is based on the management information of the at least one pair or the any combination, the encrypted data being obtained by the encryption circuit through encryption of a processing result of the processing circuit of the at least one pair or the any combination, and the processing circuit of each of the plurality of pairs other than the at least one pair or the combination thereof writes a processing result thereof to the shared memory at an address that is based on the management information of the each pair.

10. The information-processing apparatus according to claim 9, wherein in the management information of the each pair, a different address other than an address defined in advance exclusively with respect to an address defined in the management information of the at least one pair or the combination is set, and the different address coincides with the address defined in the management information of the at least one pair or the combination.

11. The information-processing apparatus according to claim 9, wherein in the management information of the each pair, an address is set, the address being defined in advance exclusively with respect to an address defined in the management information of the at least one pair or the combination, the processing circuit of each of the plurality of pairs other than the at least one pair or the combination changes an address read out from the management information of the each pair to a different address other than the read address and writes the processing result thereof to the different address, and the different address coincides with the address defined in the management information of the at least one pair or the combination.

12. A management apparatus communicating with and separate from a host system, having a first processor and an integrated circuit, and a client system having a second processor and a memory coupled to the second processor, comprising:

a receiver configured to receive, from the second processor, a request to write a processing circuit to the integrated circuit, capable of re-configuration of circuits, the processing circuit being configured to perform processing according to information transmitted by the second processor; and a third processor configured to
perform control of the first processor to write the processing circuit and an encryption circuit to the integrated circuit based on first information defining the processing circuit and second information defining the encryption circuit, the encryption circuit being configured to generate encrypted data by encrypting a processing result computed by the processing circuit, by using an encryption key for the processing circuit, the integrated circuit providing a service using identification information for at least an area of the processing circuit, and notify the client system of the encryption key;

wherein the second processor is configured to read out the encrypted data from the memory and decrypt the encrypted data by using the encryption key notified from the third processor.

13. The management apparatus according to claim 12, wherein the first processor is configured to acquire the first information and the second information, and perform the write of the processing circuit and the encryption circuit to the integrated circuit based on the first information and the second information.

14. The management apparatus according to claim 12, wherein the first processor performs control to cause a storage apparatus for holding a plurality of pieces of first information corresponding to a plurality of types of processing circuits, to write to the integrated circuit the processing circuit that is based on a piece of first information satisfying the request from the second processor.

15. The management apparatus according to claim 14, wherein
the storage apparatus further holds the second information, and
the first processor performs control to cause the storage apparatus to write to the integrated circuit the processing circuit that is based on the piece of first information for satisfying the request from the second processor and the encryption circuit that is based on the second information.

16. The management apparatus according to claim 14, wherein the first processor is configured to acquire the second information, and perform control to write the encryption circuit to the integrated circuit based on the acquired second information.

17. The management apparatus according to claim 12, wherein the first processor is configured to
manage the encryption key in association with the processing circuit,
notify the second processor of the encryption key for the processing circuit, and
transmit the first information and the second information to an information-processing apparatus including the integrated circuit.

18. A non-transitory, computer-readable recording medium having stored therein a program for causing a computer to execute a process, the process comprising:
receiving a request from another computer to write a processing circuit to an integrated circuit capable of re-configuration of circuits of the computer, the processing circuit being configured to perform processing according to first and second information transmitted by the other computer; and
performing control to write the processing circuit and an encryption circuit to the integrated circuit based on the first information defining the processing circuit and the second information defining the encryption circuit, the encryption circuit being configured to generate encrypted data by encrypting a processing result computed by the processing circuit, by using an encryption key for the processing circuit defined in the second information supplied by the other computer, the integrated circuit providing a service using identification information for at least an area of the processing circuit,
wherein a client system obtains the encrypted data from the computer and decrypts the encrypted data by using the encryption key obtained from the other computer.

19. The non-transitory, computer-readable recording medium according to claim 18, further having stored therein another program for causing the other computer to preform another method comprising:
transmitting the encryption key to a terminal; and
transmitting the first information and the second information from the other computer to the computer.

20. A processing method for a computer, comprising:
receiving, from a terminal, a request to write a processing circuit to an integrated circuit capable of re-configuration of circuits, the integrated circuit being included in an information-processing apparatus separate from the computer;
transmitting to the information-processing apparatus first and second information defining the processing circuit and an encryption circuit to the integrated circuit, the first information defining the processing circuit and second information defining the encryption circuit, the encryption circuit being configured to generate encrypted data by encrypting a processing result computed by the processing circuit, the integrated circuit providing a service using identification information for at least an area of the processing circuit; and
notifying the terminal of an encryption key used by the encryption circuit to encrypt a processing result of the processing circuit,
wherein the terminal obtains the encrypted data from the information-processing apparatus and decrypts the encrypted data by using the encryption key obtained from the computer.

* * * * *